(12) United States Patent
Struhsaker et al.

(10) Patent No.: US 10,892,816 B1
(45) Date of Patent: Jan. 12, 2021

(54) BASEBAND POLARIZATION SWITCHING AND ISOLATION IMPROVEMENT

(71) Applicant: TIONESTA, LLC, Austin, TX (US)

(72) Inventors: Paul Struhsaker, Austin, TX (US); Paul Posner, Austin, TX (US); Mehran Atamanesh, Austin, TX (US); Amir Keyvan Khandani, Austin, TX (US)

(73) Assignee: CTH Lending Company, LLC, Pittsburgh, PA (US)

( * ) Notice: Subject to any disclaimer, the term of this patent is extended or adjusted under 35 U.S.C. 154(b) by 0 days.

(21) Appl. No.: 16/557,007

(22) Filed: Aug. 30, 2019

(51) Int. Cl.
| | |
|---|---|
| *H04B 17/02* | (2006.01) |
| *H04B 7/08* | (2006.01) |
| *H01Q 21/20* | (2006.01) |
| *H01Q 21/06* | (2006.01) |
| *H04B 7/10* | (2017.01) |
| *H04B 7/185* | (2006.01) |

(52) U.S. Cl.
CPC ......... *H04B 7/0885* (2013.01); *H01Q 21/065* (2013.01); *H01Q 21/205* (2013.01); *H04B 7/10* (2013.01); *H04B 7/18515* (2013.01)

(58) Field of Classification Search
CPC ........ H04B 7/10; H04B 7/18515; H04B 1/16; H04B 7/0408; H04B 1/40; H04B 7/0868; H04B 10/40; H04B 10/50; H04B 7/01; H04B 7/0617; H01Q 21/24; H01Q 21/0025; H01Q 3/36; H01Q 15/242; H01Q 21/061; H01Q 21/065; H01Q 3/267
See application file for complete search history.

(56) References Cited

U.S. PATENT DOCUMENTS

| | | | |
|---|---|---|---|
| 10,446,938 B1 * | 10/2019 | Wang | ............ G01S 13/58 |
| 2008/0291864 A1 * | 11/2008 | Chang | ............ H04B 7/1851 |
| | | | 370/316 |
| 2009/0007185 A1 | 1/2009 | Nix et al. | |
| 2013/0115886 A1 | 5/2013 | Khan et al. | |

OTHER PUBLICATIONS

The Extended European Search Report issued in corresponding European Application No. 20168002.2, dated Sep. 3, 2020 (9 pages).

* cited by examiner

*Primary Examiner* — Nhan T Le
(74) *Attorney, Agent, or Firm* — Osha Bergman Watanabe & Burton LLP

(57) ABSTRACT

An antenna system includes an array of antenna elements, each element including: one or more first terminals and second terminals that receive a vertically polarized wireless signal and a horizontally polarized wireless signal, respectively, at a radio frequency; a first signal combining circuit and a second signal combining circuit that combine the horizontally polarized wireless signal and the horizontally polarized wireless signal to obtain a combined vertically polarized signal and a combined horizontally polarized signal, respectively; a first frequency converting circuit and a second frequency converting circuit that convert the combined vertically polarized signal and the combined horizontally polarized signal to a baseband vertically polarized signal and a baseband horizontally polarized signal, respectively, at a frequency different from the radio frequency; a baseband processing circuit that combines the baseband vertically polarized signal and the baseband horizontally polarized signal after a 90° phase shift to obtain an LHCP or RHCP signal.

18 Claims, 35 Drawing Sheets

| Azimuth | Elevation | Antenna1 | Antenna2 | .... | Antenna N |
|---------|-----------|----------|----------|------|-----------|
| 0° | 0° | $C_1^1$ | $C_2^1$ | ... | $C_N^1$ |
| 0° | 0.5° | $C_1^2$ | $C_2^2$ | ... | $C_N^2$ |
| ⋮ | ⋮ | ⋮ | ⋮ | ⋮ | ⋮ |

FIG. 9

$$H = \begin{bmatrix} -1 & 1 & 1 & 1 & -1 & 1 & 1 & 1 \\ 1 & -1 & 1 & 1 & 1 & -1 & 1 & 1 \\ 1 & 1 & -1 & 1 & 1 & 1 & -1 & 1 \\ 1 & 1 & 1 & -1 & 1 & 1 & 1 & -1 \\ -1 & 1 & 1 & 1 & 1 & -1 & -1 & -1 \\ 1 & -1 & 1 & 1 & -1 & 1 & -1 & -1 \\ 1 & 1 & -1 & 1 & -1 & -1 & 1 & -1 \\ 1 & 1 & 1 & -1 & -1 & -1 & -1 & 1 \end{bmatrix}$$

FIG. 10A

BASEBAND POLARIZATION SWITCHING AND ISOLATION IMPROVEMENT

BACKGROUND OF INVENTION

Field of the Invention

The invention generally relates to wireless communication. More specifically, the invention relates to using an antenna system to receive and process wireless communication signals transmitted from satellites.

Background Art

Antenna arrays are often used to communicate with remote objects such as satellites. In satellite communication, antennas in the antenna array receive signals transmitted from the satellite. These signals are often pre-modulated at a carrier frequency, also known as radio frequency (RF), for transmission, and may need to be converted/demodulated to a different frequency, also known as baseband frequency, after being received by the antenna array. The corresponding hardware is thus categorized into RF stage and baseband stage.

Wireless signals propagate in space in the form of electromagnetic (EM) waves. Depending on the antenna configuration, EM waves have different types of polarization. In satellite communication, the de facto standard is circular polarization which consists of right hand circular polarization (RHCP) and left hand circular polarization (LHCP). This is formed by adding vertical and horizontal polarizations with 90 degrees of relative phase shift. This 90-degree phase shift is applied at the RF stage by using an antenna with a single terminal. Conventional solutions lack flexibility of switching between RHCP and LHCP, and has poor isolation between RHCP and LHCP, inability of tracking multiple objects simultaneously, and poor signal-to-noise ratio due to inability of implementing maximum ratio combining.

SUMMARY OF INVENTION

In one aspect, the invention relates to an antenna system. The antenna system includes: a plurality of antenna elements arranged in an array, each antenna element including one or more first terminals that receive a vertically polarized wireless signal at a radio frequency and one or more second terminals that receive a horizontally polarized wireless signal at the radio frequency; a first signal combining circuit that combines the vertically polarized wireless signal received by the one or more first terminals of the plurality of antenna elements to obtain a combined vertically polarized signal; a second signal combining circuit that combines the horizontally polarized wireless signal received by the one or more second terminals of the plurality of antenna elements to obtain a combined horizontally polarized signal; a first frequency converting circuit that converts the combined vertically polarized signal to a baseband vertically polarized signal operating at a baseband frequency different from the radio frequency; a second frequency converting circuit that converts the combined horizontally polarized signal to a baseband horizontally polarized signal operating at the baseband frequency; and a baseband processing circuit that combines the baseband vertically polarized signal and the baseband horizontally polarized signal after applying a 90-degree phase shift to the baseband vertically polarized signal or the baseband horizontally polarized signal to obtain an LHCP signal or an RHCP signal.

In another aspect, the invention relates to a method for receiving and processing wireless signals. The method includes: disposing a plurality of antenna elements in an array, each antenna element including one or more first terminals that receive a vertically polarized wireless signal at a radio frequency and one or more second terminals that receive horizontally a polarized wireless signal at the radio frequency; combining the vertically polarized wireless signal received by the one or more first terminals to obtain a combined vertically polarized signal; combining the horizontally polarized wireless signal received by the one or more second terminals to obtain a combined horizontally polarized signal; converting the combined vertically polarized signal to a baseband vertically polarized signal operating at a baseband frequency different from the radio frequency; converting the combined horizontally polarized signal to a baseband horizontally polarized signal operating at the baseband frequency; and combining the baseband vertically polarized signal and the baseband horizontally polarized signal after applying a 90-degree phase shift to the baseband vertically polarized signal or the baseband horizontally polarized signal to obtain an LHCP signal or an RHCP signal.

Other aspects and advantages of the invention will be apparent from the following description and the appended claims.

BRIEF DESCRIPTION OF DRAWINGS

FIG. 9 is an example of a lookup table used for detecting the angle of incident signals according to one or more embodiments.

FIG. 10A is an 8×8 Hadamard matrix that may be used for detecting the angle of incident signals according to one or more embodiments.

DETAILED DESCRIPTION

Figure 1A:
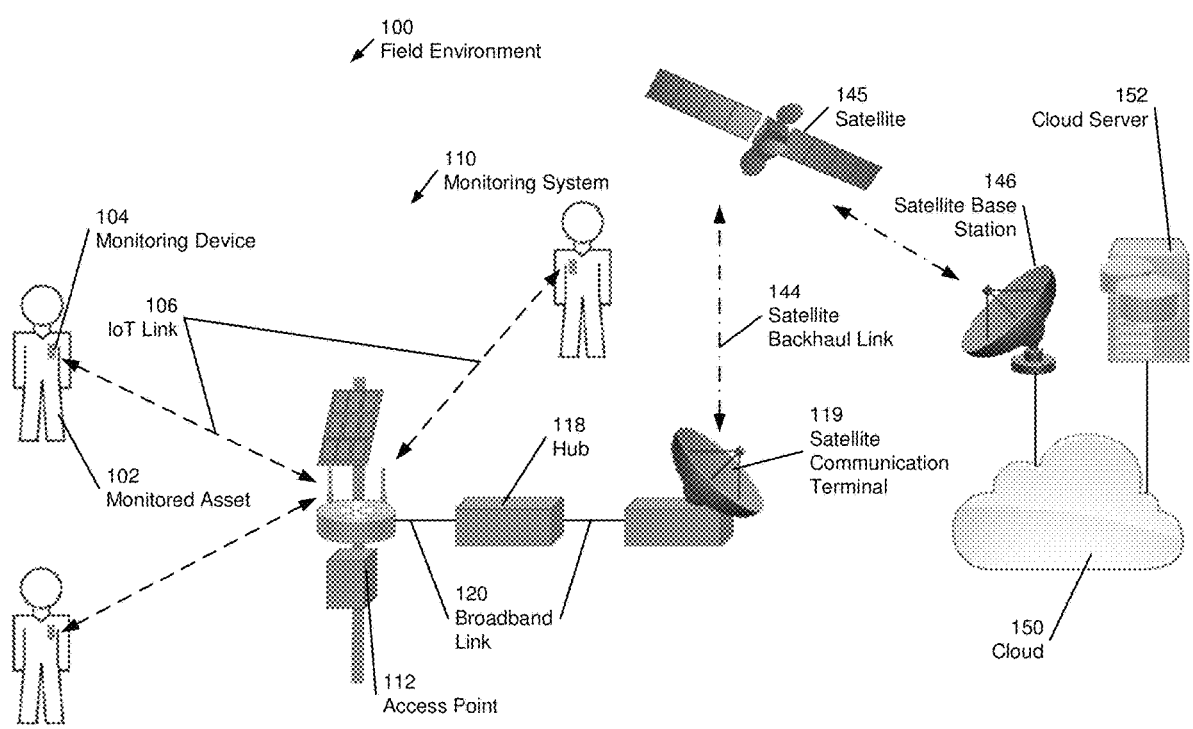
FIGS. 1A-1J show satellite communication systems in field environments, in accordance with one or more embodiments of the invention.

Specific embodiments of the invention will now be described in detail with reference to the accompanying figures Like elements in the various figures are denoted by like reference numerals for consistency. Like elements may not be labeled in all figures for the sake of simplicity.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1A-13, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that, one or more of the steps shown in the flowcharts may be omitted, repeated, and/or performed in a different order than the order shown. Accordingly, the scope of the invention should not be considered limited to the specific arrangement of steps shown in the flowcharts.

In general, one or more embodiments are directed to techniques of grouping the antenna elements forming the array and thereby divided among sub-arrays, and each sub-array relies on its dedicated receive chain (for receiver arrays) or transmit chain (for transmitter arrays). By adjusting the relative complex gains between the signals corresponding to sub-arrays, many of the shortcomings of traditional approaches mentioned earlier are remedied. By adjusting the relative complex gains of the sub-arrays, an effect equivalent to a virtual antenna pattern is created, and multiple such virtual patterns can be simultaneously formed and measured at the base-band. These additional measurements will be used in various embodiments, for example to facilitate acquisition/tracking or to improve Signal-to-Interference-plus Noise Ratio (SINR).

Embodiments of the invention may be used in any field environment, including commercial, industrial, residential and natural environments of any size. Further, the communication network supported by the satellite communication terminal applies to any type of communication or exchange of information (e.g., voice, text, video, multimedia, sensor, or monitoring data).

FIGS. 1A-1J show satellite communication systems in field environments, in accordance with one or more embodiments of the invention.

In one or more embodiments exemplified by FIG. 1A, a field environment 100 includes a satellite communication system comprising a monitoring system 110 and a satellite communication terminal 119. The field environment 100 may be any type of environment (e.g., an outdoor environment, an oil and gas facility, an area where environmental monitoring is performed, a national park, a remote location separated from networking infrastructure, a disaster site, a field hospital, etc.). A field environment 100 may also be an indoor environment (e.g., a warehouse, a school, a hospital, a prison, etc.). A field environment 100 may also include a combination of indoor and outdoor environments (e.g., a campus of a public or private institution). Any environment that is equipped with a satellite communication terminal 119 or user devices (e.g., smartphone 128, a laptop 130 shown in FIGS. 1D-1E) may be considered a field environment 100. Further, the local network is not limited to a monitoring system 110, but may provide any appropriate data service to various connected devices.

The satellite communication terminal 119 connects a local network (i.e., the monitoring system 110) in the field environment 100 with an external network or cloud computing platform (e.g., cloud 150) via a satellite backhaul link 144 to a satellite 145. The satellite 145 may be one or more geostationary or non-geostationary satellites (e.g., Low Earth Orbit (LEO) satellite) with a satellite radio transceiver. A field environment 100 anywhere on the planet may use the satellite communication terminal 119 to establish communications with the growing number of communication satellite constellations. The satellite 145 may relay communications with other satellites 145 or may directly relay communications to a satellite base station 146 connected to the cloud 150 or cloud server 152.

Within the field environment 100, monitored assets 102, may be tracked or monitored by the monitoring system 110. Monitored assets 102 may include stationary and/or moving assets. A moving asset 102 may be a person, an animal, equipment (e.g., a forklift truck), goods, products or other items, including luggage, shipments such as boxes or containers, etc. A stationary asset may be anything equipped with sensors to monitor function and/or environmental conditions. Examples for such stationary assets include weather stations, pumps, pipelines, refrigeration equipment, air quality sensors, etc. The monitoring may be performed by a monitoring device 104 that is carried by the monitored asset 102 or that is attached or installed on the monitored asset 102.

In one or more embodiments, a monitored asset 102 may be controlled via the monitoring system 110. A monitoring device 104 may interface with the monitored asset 102 to, for example, activate or deactivate functions, switch modes, etc. If the monitoring device 104 is also used for sensing, a closed loop operation via the monitoring system 110 may be implemented. Based on sensed conditions, the monitored asset may be controlled in order to change the sensed conditions.

In one or more embodiments, an access point 112 functions as an intervening device that facilitates one or more broadband links 120 and/or Internet of Things (IoT) links 106 between devices of the field environment 100. The access point 112 may be a permanent part of an established network infrastructure in the field environment 100 or a temporary installation to supplement the networking range, capacity, or capabilities of the satellite communication terminal 119. The access point 112 comprises multiple component described below with respect to FIG. 3B. The access point 112 may further interface with a hub 118 (i.e., an intervening device that also supplements the networking range, capacity, or capabilities of the satellite communication terminal 119), which may perform processing of the data received from the monitored assets 102 via the access points 112. The hub 118 may operate in conjunction with or independently from the satellite communication terminal 119, as described below.

In one or more embodiments, data gathered from the monitored assets 102 is uploaded to the cloud 150 and is made accessible to users via a processing platform described below with reference to FIG. 2F. Additionally, or alternatively, the data may also be locally accessible via the hub 118, satellite communication terminal 119, or via the access point 112.

Figure 1B:
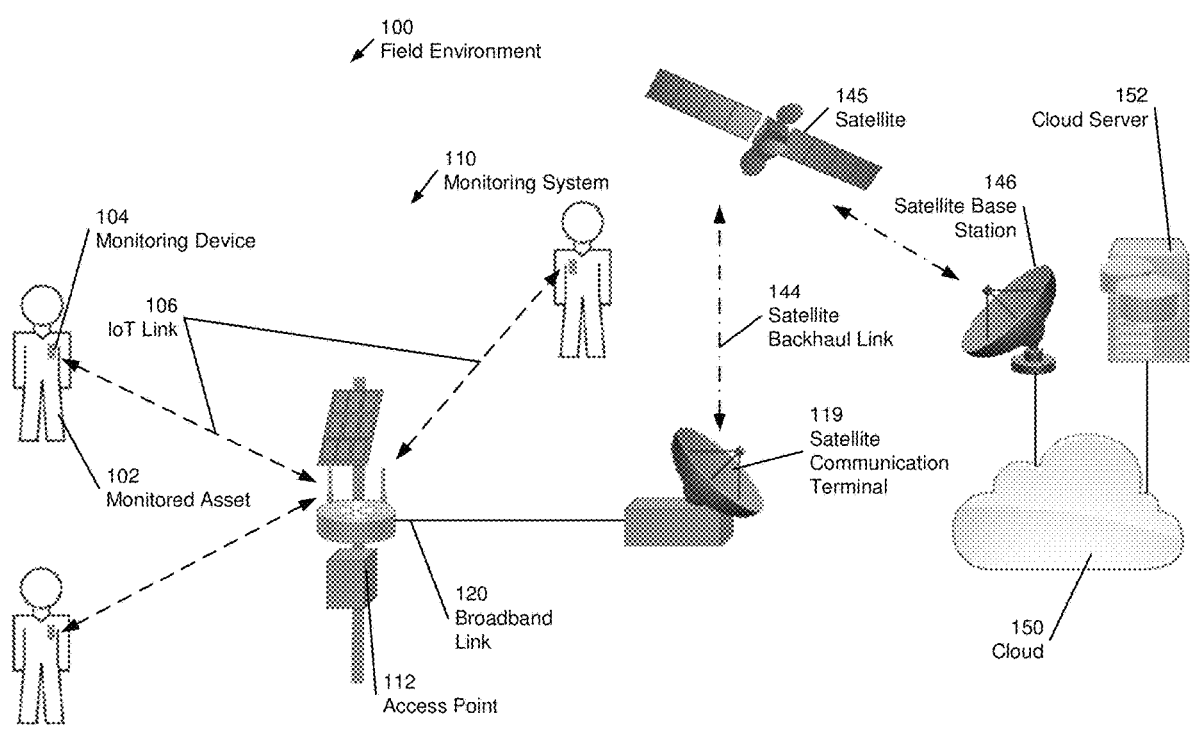

In one or more embodiments exemplified by FIG. 1B, an alternative configuration of the satellite communication system does not include the hub 118. The satellite communication terminal 119 may have the computing capacity to independently process all data and communications within the field environment 100. For example, a short range network can be quickly established by setting up the satellite communication terminal 119 and a single access point 112. If the network grows to a size that exceeds the processing capability of the satellite communication terminal 119, a hub 118 may be installed as an intervening device to supplement the networking range, capacity, or capabilities of the satellite communication terminal 119, as shown in FIG. 1A.

Figure 1C:
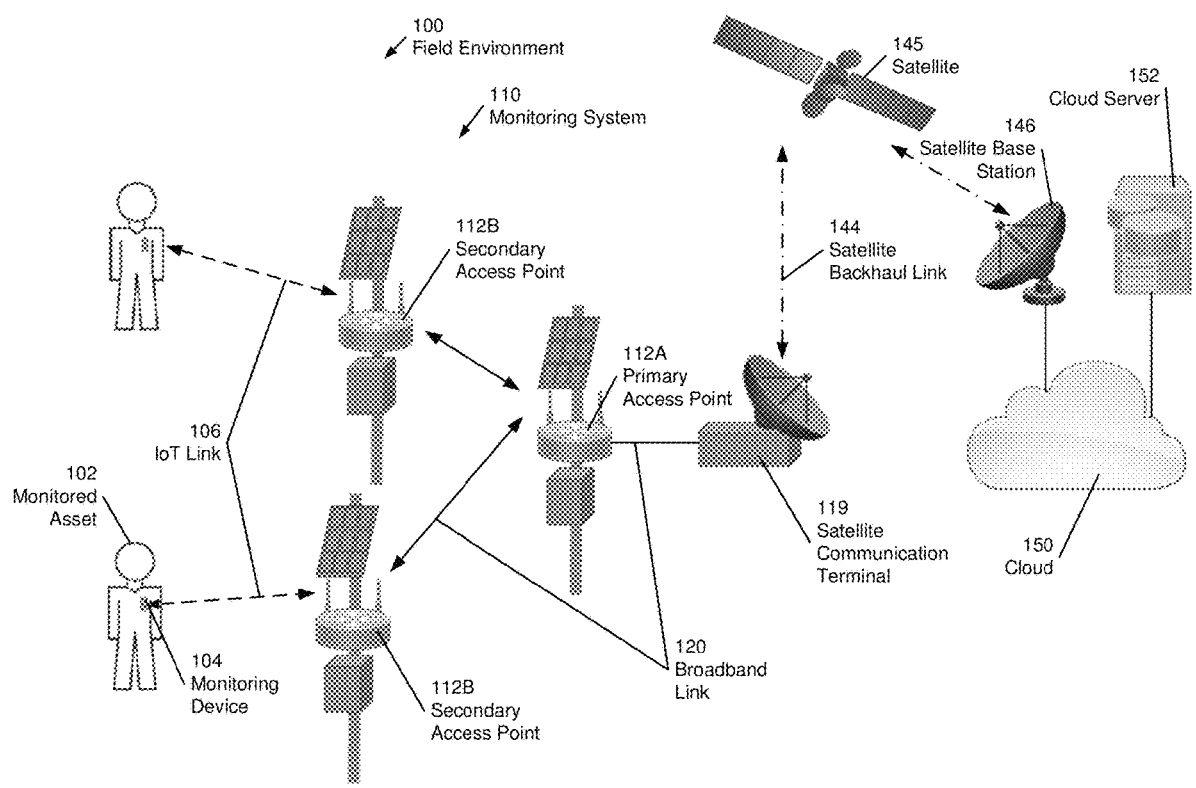

In one or more embodiments exemplified by FIG. 1C, an alternative configuration of the satellite communication system includes multiple access points 112A, 112B. Each access point 112 may have a limited range that may depend on the transmission power of the access point 112, but also on the transmission power of the monitoring devices 104 or other devices in the field environment 100. Accordingly, in order to extend the communication network across larger field environments 100, multiple access points 112A, 112B may be deployed at different locations in the environment. FIG. 1C shows a primary access point 112A and two secondary access points 112B. The primary access point 112A may directly interface with the satellite communication terminal 119. The secondary access points 112B may interface with the primary access point 112A using a broadband link 120 and therefore indirectly interface with the satellite communication terminal 119. The broadband link 120 may be a 10/100/1000 Mbps Ethernet link, optical link, or any other appropriate wired communication link without departing from the invention. Alternatively, the broadband link 120 may be part of a wireless local area network (WLAN) based on a Wi-Fi standard (e.g., an 802.11 standard), an Internet of Things (IoT) standard, or any other appropriate wireless communication link without departing from the invention.

By using additional access points 112, distributed across the field environment 100, larger areas may thus be covered by the satellite communication system. Those skilled in the art will appreciate that various configurations of multiple access points 112 are feasible without departing from the invention. For example, the satellite communication system may include any number of access points 112 to cover a field environment 100 of any size. For example, a daisy chain configuration of multiple access points 112 (i.e., tertiary access points may interface with the secondary access points, analogous to how the secondary access points interface with the primary access point) may increase the covered area further. In hybrid configurations, some access points 112 may be daisy-chained, whereas other access points 112 may directly interface with a hub 118 or the satellite communication terminal 119.

Figure 1D:
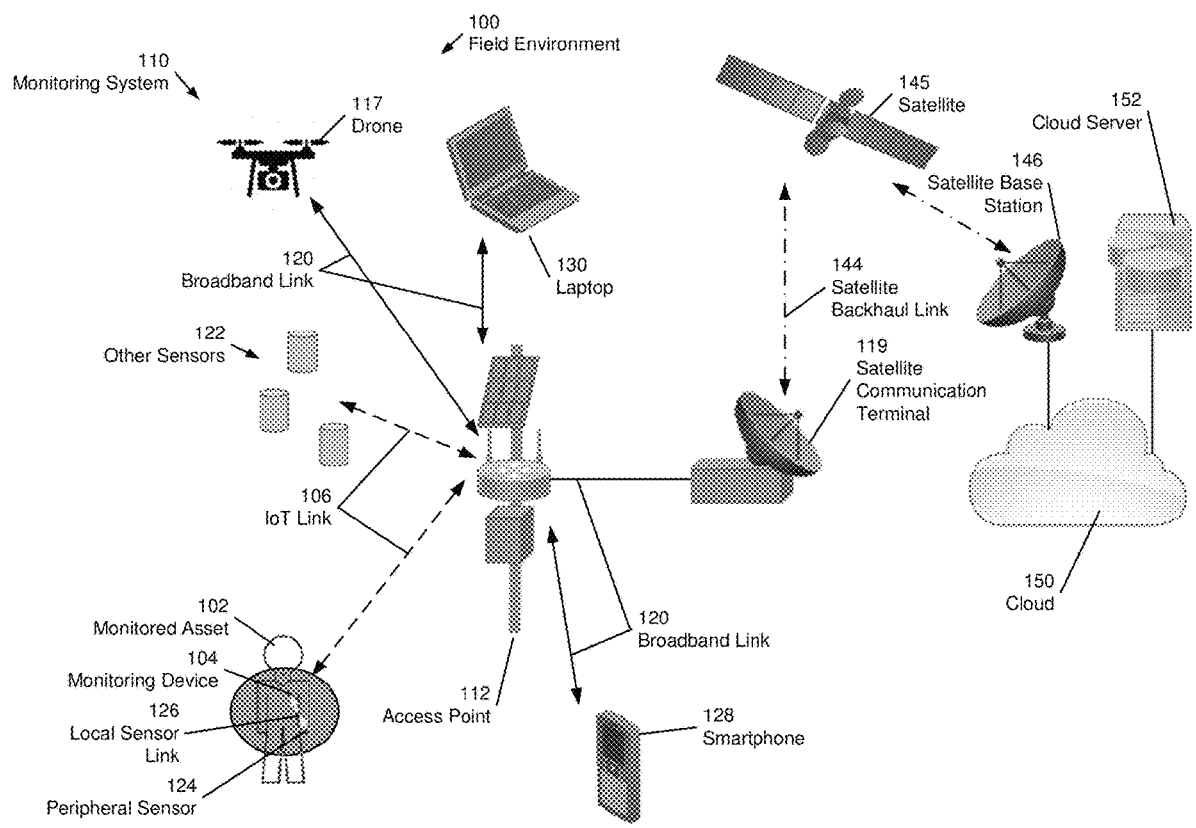

In one or more embodiments exemplified by FIG. 1D, an alternative configuration of the satellite communication system includes user devices. In one or more embodiments, the access point 112 is used to provide a user access to the communication network via a broadband link 120 to a smartphone 128 or laptop 130. Of course, the user devices may also connect directly to the satellite communication terminal 119 via a broadband link 120. Data that is provided by the monitoring devices 104 and/or monitoring device data that has been previously collected, processed and/or stored by the satellite communication terminal 119 may be obtained via a processing platform, described below with respect to FIG. 2F.

In one or more embodiments, a broadband link 120 may further be used to interface additional devices with access points 112 of the satellite communication system. For example, a drone 117 may communicate with the access point 112 via the broadband link 120 to relay real-time images, sensor information (e.g., LIDAR data, spectroscopic data, radiation data, survey information) to the communication network. The drone 117 may be in contact with various access points 112 depending on the drone's location in the field environment 100. The drone 117 may further not necessarily be in continuous contact with an access point 112 and may, instead, operate autonomously and may only require periodic contact with an access point 112. One or more drones 117 may be used to visually inspect the field environment 100. Multispectral cameras and/or mosaic photography may be used to monitor environmental conditions and/or activity in the field environment 100 using additional analytics software installed in the access point 112, a hub 118, or the satellite communication terminal 119.

In one or more embodiments, other sensors 122 that rely on a broadband link 120 or IoT link 106 to the access points 112 may be part of the satellite communication system as well. For example, cameras that are equipped with a Wi-Fi interface may be used to visually monitor certain areas of the field environment 100. Such cameras may include motion detection to detect activities including expected or desired activity, but also unexpected activity, such as intrusions. Additionally, or alternatively, cameras may provide still photos, video clips or live videos and/or alarms based on a detection of certain events in the videos or photos. Other sensors 122 may perform environmental measurements such as air temperature, humidity, or may be used to monitor equipment such as pumps, storage tanks, pipelines, etc.

In one or more embodiments, peripheral sensors 124 may be used to acquire additional measurements that may not be obtainable by a monitoring device 104 or a user device. Any number of peripheral sensors 124 may be used in conjunction with a monitoring device 104 or user device. A local sensor link 126 may transmit the measurements obtained by the peripheral sensor 124 to the monitoring device 104 or the user device, which may relay these measurements to one of the access points 112.

In one or more embodiments, other devices that rely on a broadband link 120 or IoT link 106 to the access points 112 may be part of the satellite communication system as well. The monitoring system is a non-limiting example of various different technologies connecting to a single communications network. However, the broadband link 120 may be used to connect one or more user devices for any purpose. For example, the user devices may be used for voice over IP (VOIP) calls, video calls, texting, general Internet access, intranet access, and/or for any other data service).

In a non-limiting example, a smart phone 128 may connect via broadband link 120 to satellite communication terminal 119 and connect via satellite backhaul link 144 and the cloud 150 to an external cellular network to conduct a telephone call. Similarly, satellite communication terminal 119 may connect two smart phones 128 within the field environment 100 to conduct a telephone call without the support of an existing or external cellular network. Furthermore, the satellite communication terminal 119 may handle the transition of a telephone call to an external cellular network if one of the smart phones 128 leaves the field environment 100 and enters the coverage range of the external cellular network. While the above example is described with respect to telephone calls and an external cellular network, the invention is not limited to this data service or type of external network. For example, any appropriate type of data service may be managed internally within the field environment 100 and/or externally with an external network outside of the field environment 100.

In one or more embodiments of the invention, the access point 112 is a two-tier access point equipped with a first tier broadband communication interface and a second tier narrowband communication interface. The first tier broadband communication interface provides the broadband link 120 and the second tier narrowband interface provides the IoT link 106. While the narrowband link may provide coverage of a comparatively large area at a reduced data rate that may be particularly suitable for monitoring devices 104 and other sensors 122, the broadband link 120 may provide coverage of a comparatively smaller area at a higher data rate that may be suitable to serve other devices such as laptops 130, smartphones 128, or other broadband equipment, including drones 117, cameras (not shown), etc. The broadband link 120 may further be used to establish a mesh network with other access points 112, as previously shown in FIG. 1C. In one or more embodiments, the satellite communication system includes a three-tier network that, in addition to the two tiers of the access point 112, includes a third tier formed by the local sensor link 126, as previously described.

Figure 1E:
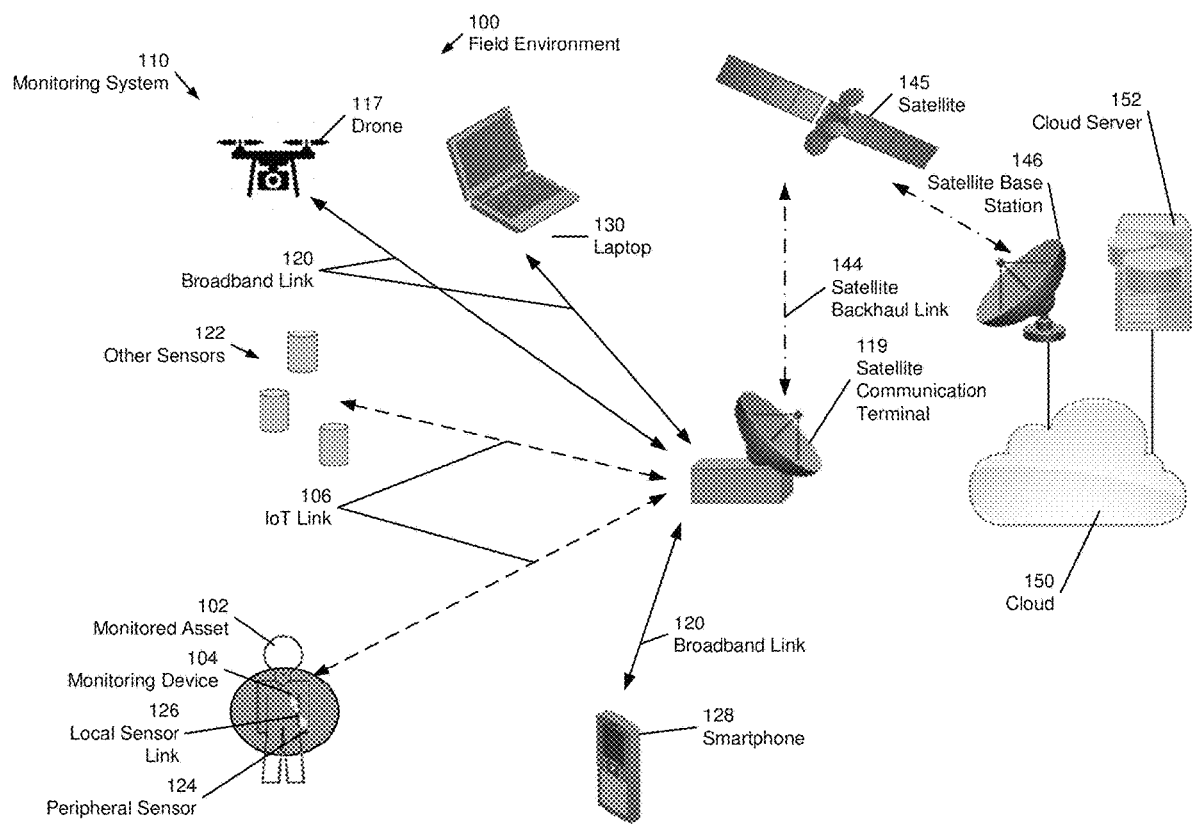

In one or more embodiments exemplified by FIG. 1E, the satellite communication terminal 119 may directly connect with the various devices in the field environment 100 via broadband links 120 or IoT links 106. The satellite communication terminal 119 is a communications network in a box that may independently create and maintain a one-, two-, or three-tier network described above. Intervening devices (e.g., an access point 112 or a hub 118) merely supplement the networking range, capacity, or capabilities of the satellite communication terminal 119.

Figure 1F:
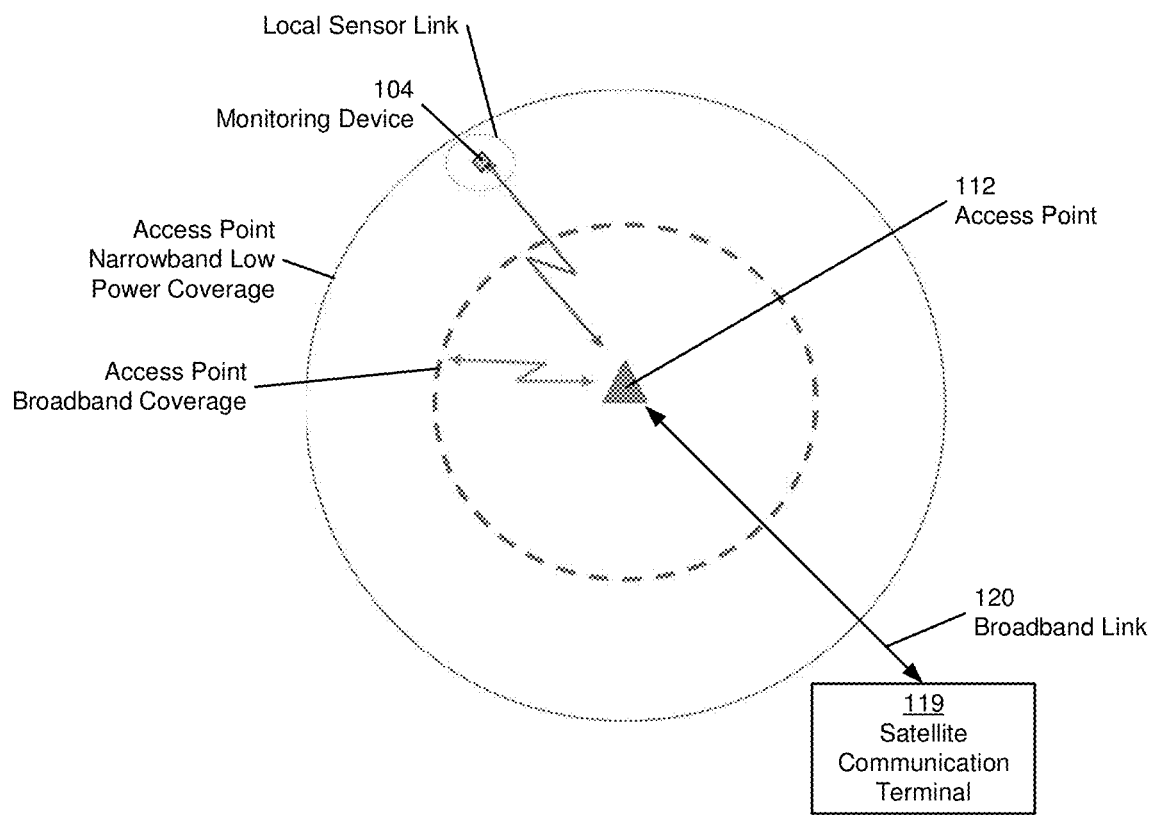

FIG. 1F shows an exemplary radio signal coverage of a satellite communication system comprising a satellite communication terminal 119 connected to a single access point 112 by a wired broadband link 120. A broadband coverage region of the access point 112, denoted by a dashed circle, surrounds the access point 112. Within the broadband coverage region, devices that require a broadband link 120 may be installed. A larger narrowband low power coverage region of the access point 112, denoted by the solid circle, surrounds the access point 112. While less data may be transmitted using an IoT link 106 (i.e., the local sensor link arrow), the IoT link 106 may require less power and may be feasible over longer distances, in comparison to a broadband link 120. For example, a battery-powered device (e.g. a monitoring device 104) may use the IoT link 106 rather than the broadband link 120 to conserve power. Those skilled in the art may appreciate that the areas that receive broadband and narrowband coverage depend on various factors, including the transmission power of the components involved in data transmissions, the types of antennas being used, terrain features, etc. Thus, in one or more embodiments, the local network within the field environment 100 may comprise only wired communication links or a mixture of wired and wireless communication links.

Figure 1G:
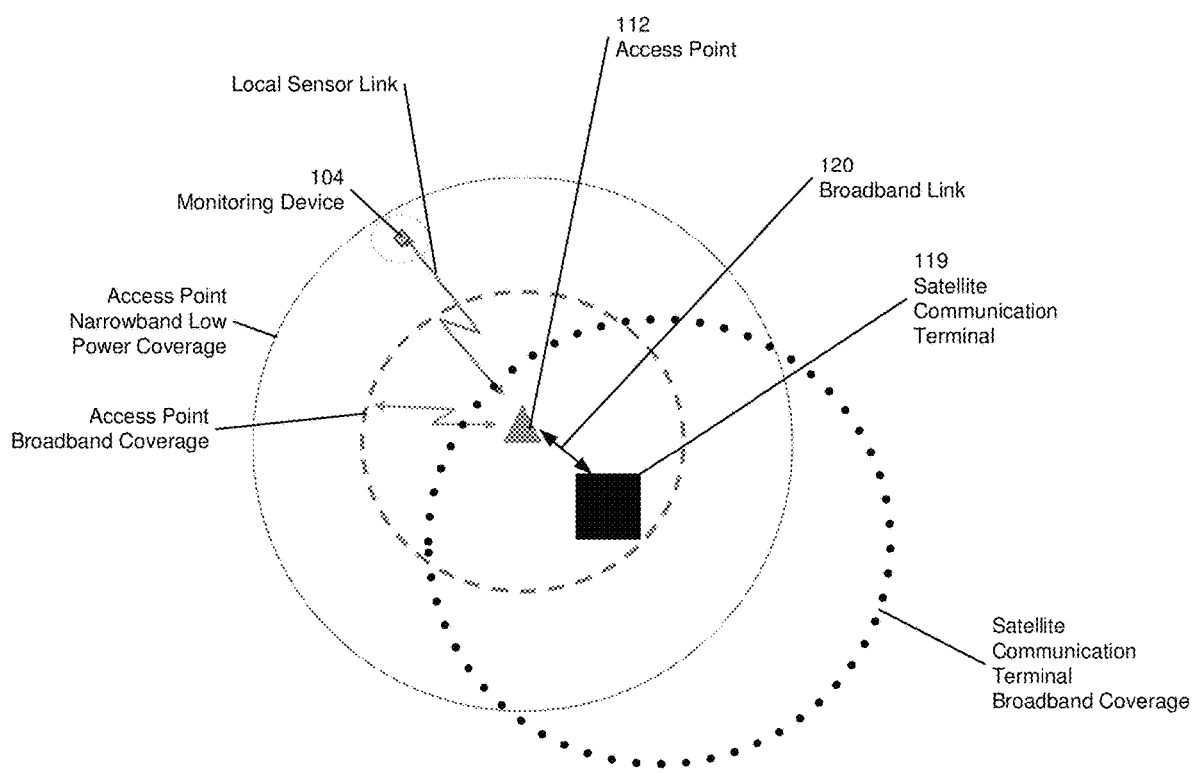

FIG. 1G shows an alternative radio signal coverage of a satellite communication system comprising a satellite communication terminal 119 connected to a single access point 112 by a wireless broadband link 120. A satellite communication terminal broadband coverage region, denoted by a dotted circle, surrounds the satellite communication terminal 119. Because the access point broadband coverage region and satellite communication terminal broadband coverage region overlap both devices, the access point 112 and satellite communication terminal 119 may support a wireless broadband link 120. Thus, in one or more embodiments, the local network within the field environment 100 may comprise only wireless communication links.

Figure 1H:
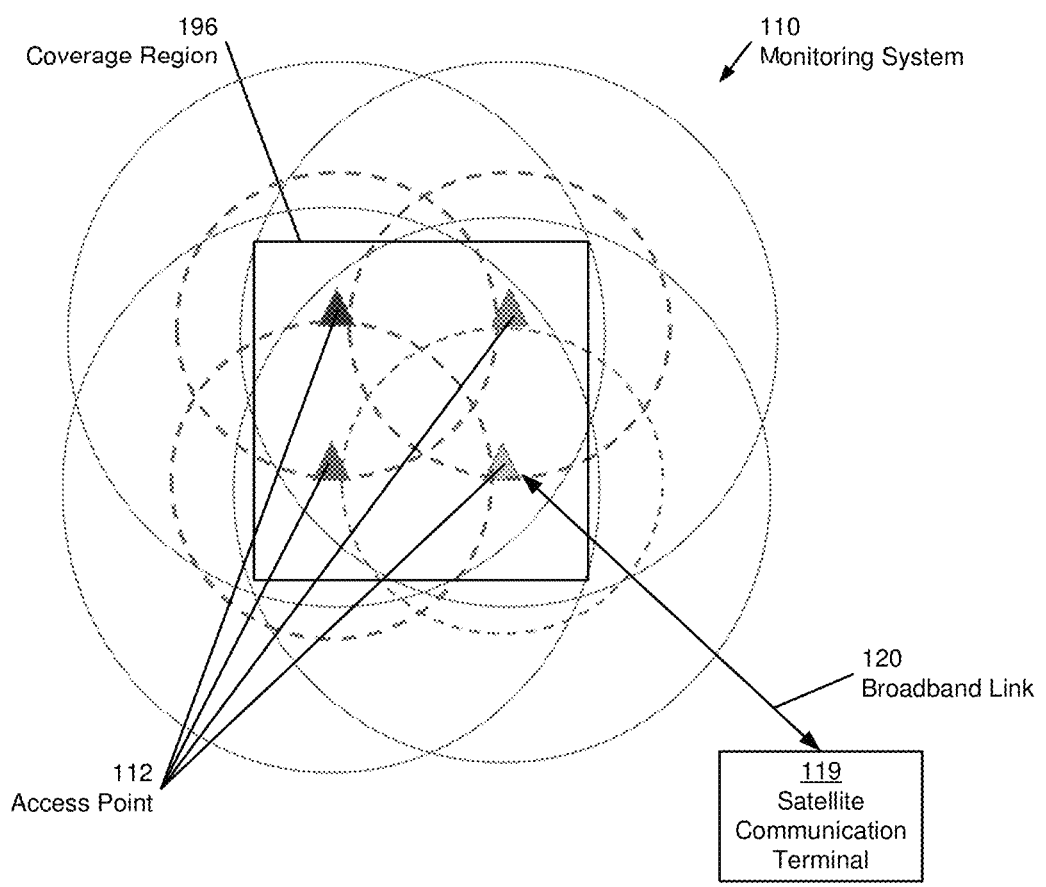

FIG. 1H shows an exemplary radio signal coverage of a satellite communication system comprising a satellite communication terminal 119 connected to a network of four access points 112. In the shown configuration, the access points 112 are spaced such that there is significant overlap between the broadband coverage (dashed circles) provided by the different access points 122, but also between the narrowband coverage (solid circles) provided by the different access points 122. Using the set of access points 122, a coverage region 196 is entirely covered by narrowband signals of at least three access points. In one or more embodiments, overlap of narrowband coverage provided by multiple access points 112 is desirable. Specifically, in a coverage region 196 where a device receives narrowband coverage by at least three narrowband signals (e.g., IoT signals), the signals of the device, received by at least three access points may be used to determine the location of the device, thus enabling, for example, location tracking of the device. The location of the device may be determined using time difference of arrival (TDOA) methods. Accordingly, location tracking using TDOA methods may be performed in the coverage region 196 in which at least three access points may receive transmissions sent by the device. TDOA positioning may provide moderately accurate location information (e.g. with an accuracy of approximately 30-75 m), although the accuracy may deteriorate when the quality of the reception at one or more of the access points 112 is poor. The measurement accuracy may, however, not be strongly affected by the presence of buildings and foliage. Alternatively, received signal strength indication (RSSI) positioning may provide location information with limited accuracy, (frequently no more accurate than approximately 75 m), and may allow positioning even under difficult conditions (e.g., when fewer than three access points are available). Further, if equipped with a global positioning system (GPS) receiver, the device's location may be determined using the GPS receiver. GPS positioning does not rely on the exchange of signals with access points 112 and may thus be available anywhere, even outside the coverage region 196, although power requirements may be significantly higher when relying on GPS. Further, GPS signals may be blocked by structures, foliage, etc. However, the accuracy is typically higher than the accuracy of the TDOA and RSSI methods.

Accordingly, to enable energy efficient location determination in certain regions, access points 112 may be strategically placed to have overlapping coverage regions, thereby not requiring the use of power consuming GPS positioning. In regions where TDOA based location services are desired, a dense grid of access points with a high degree of overlap may be installed to ensure that overlapping coverage is provided by at least three access points, whereas a sparse grid of access points may be installed in other regions. In these other regions, less accurate RSSI positioning may be used, or if an accurate location is required, GPS positioning may be used.

Figure 1I:
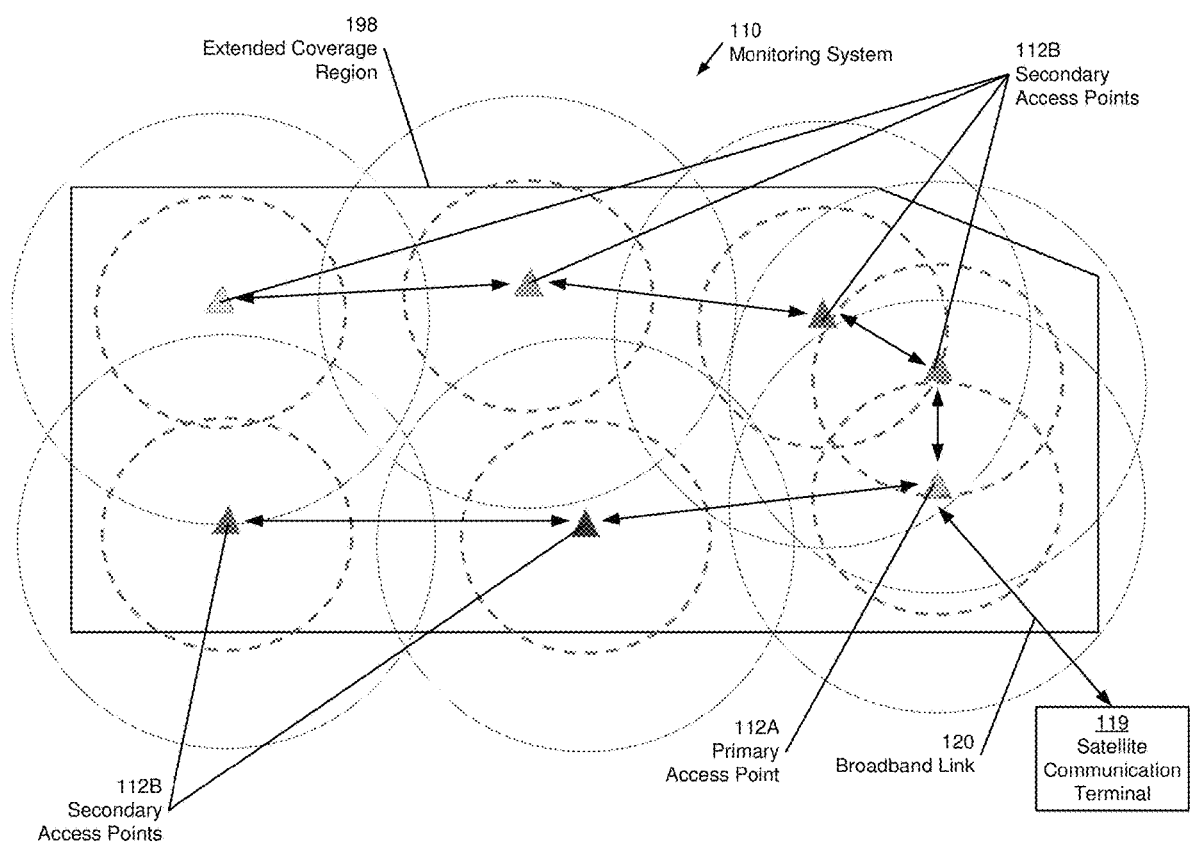

FIG. 1I shows an exemplary radio signal coverage of a satellite communication system comprising a satellite communication terminal 119 connected to a network of multiple daisy-chained access points 112A, 112B. To cover large areas effectively, access points may need to be deployed strategically to cover the field environment 100. The configuration shown in FIG. 1I uses a primary access point 112A that directly interfaces with the satellite communication terminal 119 and provides an interface to the secondary access points 112B. Using the daisy-chained set of access points 112A, 112B, a coverage region 198 is entirely covered by a narrowband signal (solid circles), while some areas are also covered by a broadband signal (dashed circles). In the exemplary configuration shown in FIG. 1I, the left part of the coverage region 198 is covered by sparsely placed access points and the broadband coverage regions are non-overlapping. In contrast, the right part of the coverage region 198 is covered by densely placed access points and the broadband coverage is overlapping, thus establishing a contiguous region with broadband signal coverage. Those areas may, thus, serve different purposes. For example, the left part may be used to monitor sensors that merely require a narrowband communication interface (e.g., weather sensors or monitoring devices for assets that do not require TDOA tracking). In contrast, the right part may be used for a drone surveillance that requires a continuous broadband signal. Those skilled in the art will appreciate that even though FIG. 1I shows the primary access point 112A interfacing directly with the satellite communication terminal 119, a hub 118 may be inserted as an intervening device to aid data processing and routing communications within the extended coverage region 198. Further, to provide coverage for even larger areas and/or for larger numbers of connected devices, additional access points 112 and/or additional hubs 118 may be deployed.

Figure 1J:
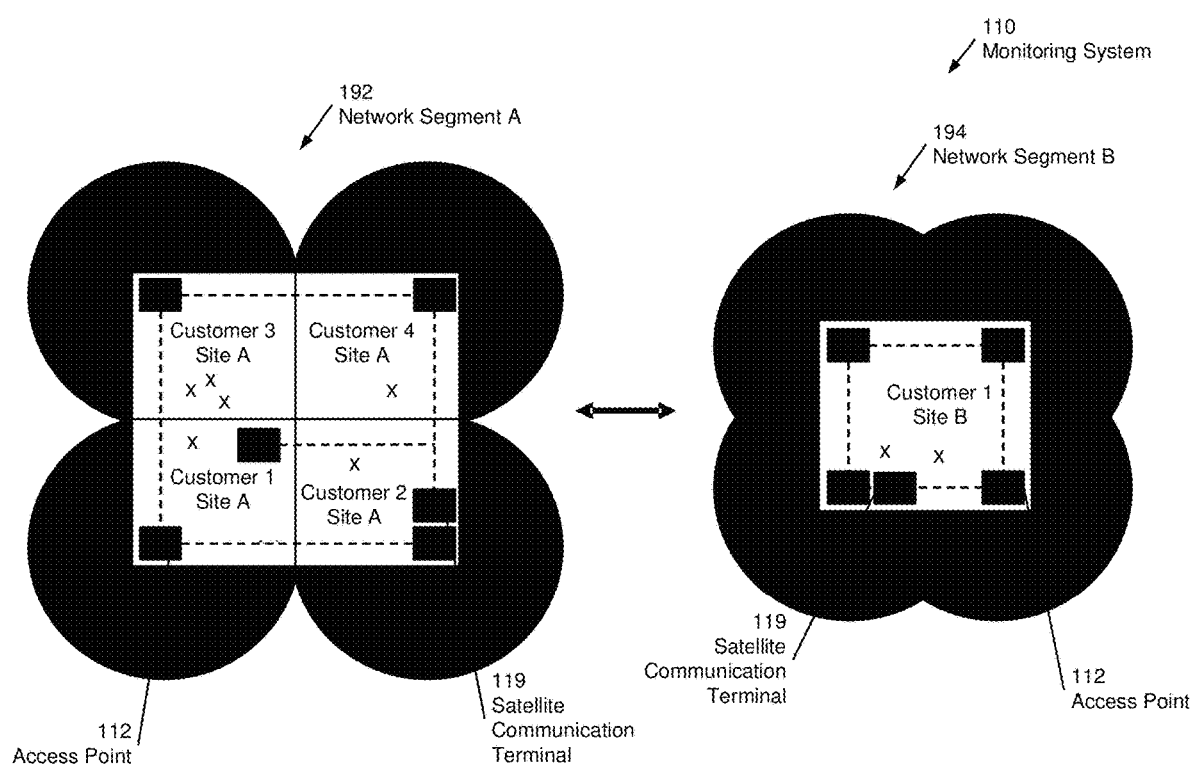

In one or more embodiments exemplified by FIG. 1J, the satellite communication system includes multiple network segments 192, 194. Each of the network segments 192, 194, is equipped with a satellite communication terminal 119 and multiple access points 112, providing broadband and/or narrowband network coverage. Both network segments may operate using the same communication protocols. Network segment A 192 is configured as a multitenant site (i.e., multiple customers are served by the network segment). Network segment B 194 is configured as a single tenant site.

Consider, for example, a satellite communication system installed at a remote oilfield facility that is occupied by multiple companies (e.g., an oil company and multiple oil and gas service companies). Assume that all of the companies require a satellite communication network to share data and information. Accordingly, the companies agree to have a common satellite communication system installed by a satellite service provider. Customer 1 is an oil company that owns the remote oilfield facility covered by network segment A and a headquarters covered by network segment B. Management staff of customer 1 are distributed across various sites of the remote oilfield facility but still need to communicate with each other and with headquarters. Customers 2-4 are different oil and gas service providers that operate different sites of the remote oilfield facility. Accordingly, network access between customers may be regulated and authorized by broadband services of the satellite communication terminal 119 to maintain confidentiality (e.g. firewalls) and track usage (e.g., monitor data caps) of and between the various customers. Broadband services are described below with respect to FIG. 2F.

The exemplary satellite communication system of FIG. 1J thus illustrates a multitenant, multisite satellite communication system, in accordance with one or more embodiments of the invention. Those skilled in the art will appreciate that satellite communication systems are fully scalable. For example, satellite communication systems may include any number of sites, any number of device, or any number of customers. Further, satellite communication systems, in accordance with one or more embodiments of the invention, may be globally distributed. For example, network segments A 192 and network segments B 194 may be on different continents. Network segments or sites may grow arbitrarily large, with any number of access points and/or devices. However, eventually a network segment or site with numerous devices may become congested, or the satellite communication terminal 119 of the network segment may be overwhelmed by the incoming volume of data. In such a scenario, the network segment may be split into two or more separate network segments, each with its own satellite communication terminal 119.

Figure 2A:
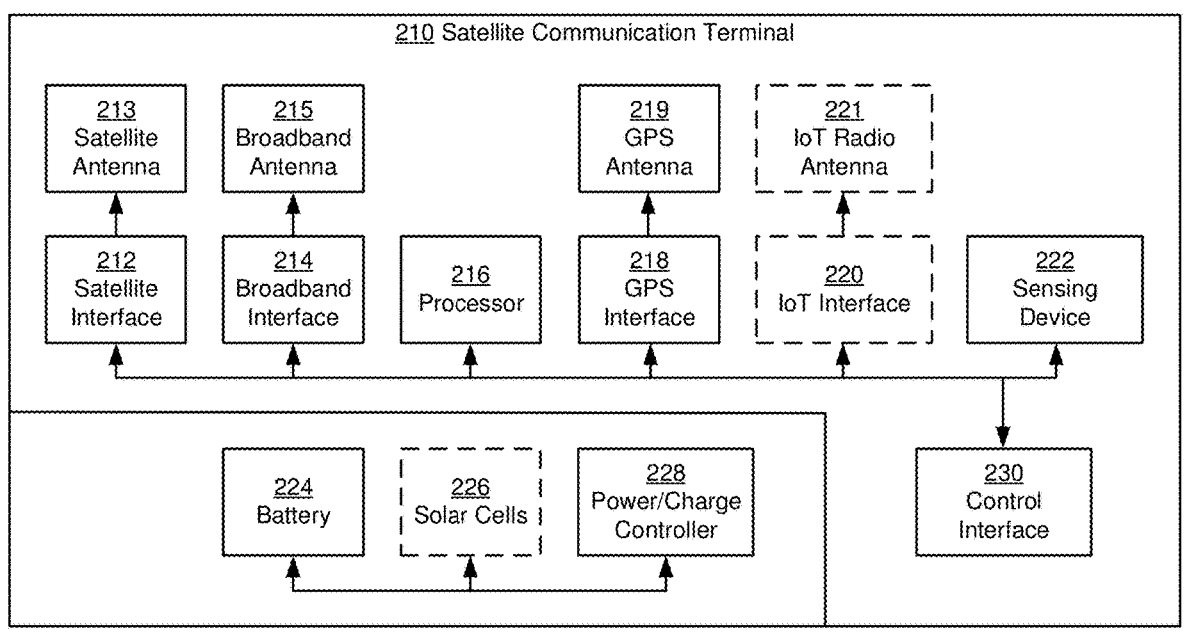
FIGS. 2A-2F show a satellite communication terminal, a satellite antenna, a satellite communication terminal-cloud configuration, and a processing platform, in accordance with one or more embodiments of the invention.

FIG. 2A shows a satellite communication terminal, in accordance with one or more embodiments of the invention. The satellite communication terminal 210 may be equipped with a mounting or attachment element that is application specific. For example, the satellite communication terminal 210 may be permanently or temporarily bolted to an equipment, installation, vehicle, or building in the field environment 100. Those skilled in the art will appreciate that the satellite communication terminal 210 is suitable for many applications and may thus be adapted to include mounting elements as needed. The satellite communication terminal 210 may further include several other components, each of which is described below, implemented using hardware, software, or a combination of hardware and software.

The satellite communication terminal 210 comprises a satellite interface 212 (i.e., modem) that manages communication over one or more satellite backhaul links 144. The satellite interface 212 may control a satellite antenna 2B in conjunction with a processor 216. Further, the satellite interface 212 may perform any necessary operations to filter, aggregate, compress, encrypt or otherwise process data that is sent or received (i.e., exchanged) over a satellite backhaul link 144. The satellite antenna 213 creates and maintains one or more satellite backhaul links 144 with one or more satellites 145. Various examples and embodiments of the satellite antenna 213 are described below with reference to FIGS. 2B-2D.

The satellite communication terminal 210 comprises a broadband interface 214 (i.e., modem) that manages communication over one or more broadband links 120 in the field environment 100. The broadband interface 214 may comprise one or more terminals to establish a wired broadband link 120 in the field environment 100. The broadband interface 214 may control one or more broadband antennas 215 in conjunction with a processor 216 to establish a wireless broadband link 120 in the field environment 100. Further, the broadband interface 214 may perform any necessary operations to filter, aggregate, compress, encrypt or otherwise process data that is sent or received (i.e., exchanged) over a broadband link 120.

The broadband interface 214 may support mesh, point-to-point, and multi-point connections. The broadband interface 214 may be based on a Wi-Fi standard (e.g., 802.11 interface) using one or more radio bands (e.g., the 2.4 and/or 5 GHz radio bands), IoT standard, or any other appropriate wireless communication interface without departing from the invention. Alternatively, the broadband interface 214 may be a 10/100/1000 Mbps Ethernet interface, optical interface, or any other appropriate wired communication interface without departing from the invention.

The satellite communication terminal 210 comprises a processor 216 that may be part of a computing system that controls the satellite communication terminal 210, as described below with reference to FIG. 8. The processor 216, with associated memory and storage devices (not shown), controls the various components of the satellite communication terminal 210. For example, the processor 216 may control a beam direction of the satellite antenna 213, as described below with respect to FIGS. 2B-2D. Furthermore, the processor 216 may gather and process data from one or more of the sensing devices 222 to control a beam direction of the satellite antenna 213. The processor 216 may perform broadband services on data exchanged with a device in the field environment 100 over the broadband link 120 and the satellite backhaul link 144. Further, the processor 216 may provide access to the exchange data to the device (e.g., via a processing platform 270 described below with reference to FIG. 2F).

The satellite communication terminal 210 comprises a Global Positioning System (GPS) interface 218 that manages GPS information. The GPS interface 218 may control a GPS antenna 219 in conjunction with the processor 216. Further, the GPS interface 214 may perform any necessary operations to filter, aggregate, compress, encrypt or otherwise process data that is received by GPS antenna 219. In other words, the GPS antenna and GPS interface may provide location information of the satellite communication terminal 210 to the processor 216. The processor may use the location information to control the beam direction of the satellite antenna 213, as described below with respect to FIG. 8. When not in use, the GPS interface 218 may be in a deep sleep mode or completely powered down.

The satellite communication terminal 210 may optionally comprise an IoT interface 220 that manages communication over one or more IoT links 106 in the field environment 100. The IoT interface 220 may comprise one or more terminals to establish a wired IoT link 106 in the field environment 100. The IoT interface 220 may control an IoT radio antenna 221 in conjunction with the processor 216. Further, the IoT interface 220 may perform any necessary operations to filter, aggregate, compress, encrypt or otherwise process data that is sent or received (i.e., exchanged) over an IoT link 106. The IoT radio antenna 221 creates and maintains one or more wireless IoT links 106 with various IoT devices in the field environment 100.

The IoT interface 220 may be configured to communicate with one or more access points 112 or other devices (e.g., other sensors 122, a smartphone 128, or a laptop 130) in the field environment 100, using an IoT protocol such as LoRa. Communications may include, but are not limited to, the sending/receiving of a time base from one or more access points 112 or devices in the field environment 100, the receiving of a configuration, the receiving of a firmware, the sending/receiving of data, and/or the sending/receiving of device status data, such as errors, battery level, etc. The activity of the IoT interface 220 may be optimized to minimize power consumption. For example, the IoT interface 220 may be in a deep sleep mode whenever no transmission of data is required.

The satellite communication terminal 210 may comprise one or more sensing devices 222 that obtain various information about the satellite communication terminal 210 (e.g., position, orientation, internal temperature, ambient temperature, ambient pressure, altitude, humidity, etc.). These sensing devices 222 may include, but are not limited to a digital level, a magnetometer, an accelerometer, a thermometer, a barometer, an altimeter, a hygrometer, or any appropriate sensing device. The one or more sensing devices 222 may be used to determine the location of the satellite communication terminal 210 when other, more power efficient, methods for determining the location (e.g., GPS, TDOA, and/or RSSI) are not available or the previously acquired location data is not sufficiently accurate. The one or more sensing devices 222 may be interfaced with the processor 216 using digital and/or analog interfaces and may have a wired, wireless, optical, or any appropriate interface to the satellite communication terminal 210. When not in use, the sensing device 222 may be in a deep sleep mode or completely powered down.

In one or more embodiments, the components of the satellite communication terminal 210 are battery powered. The battery 224 may be a rechargeable or a non-rechargeable battery that may or may not be replaceable. The battery 224 may be selected to power the components of the satellite communication terminal for a specified duration, e.g., for multiple months or years. If the battery 224 is rechargeable, a power/charge controller 228 may control the charging of the battery 224 from optional solar cells 226 or other external power sources, such as inductively provided power. The power/charge controller 228 may further communicate battery status information to the processor 216. In addition, the battery level may directly govern the operation of the satellite communication terminal 210. For example, when a low battery level is detected, the communication frequency may be reduced, certain sensors may be deactivated, etc. In one or more embodiments, external power supplies (not shown) may be used if the satellite communication terminal 210 is stationary.

The satellite communication terminal 210 comprises a control interface 230 that may include analog or digital inputs/outputs, including communication bus systems, and/ or relays, motors, or any other equipment that may be used to control functions of the satellite communication terminal 210. Those skilled in the art will appreciate that the control interface may be any appropriate interface used to control any function of the satellite communication terminal 210.

Figure 2B:
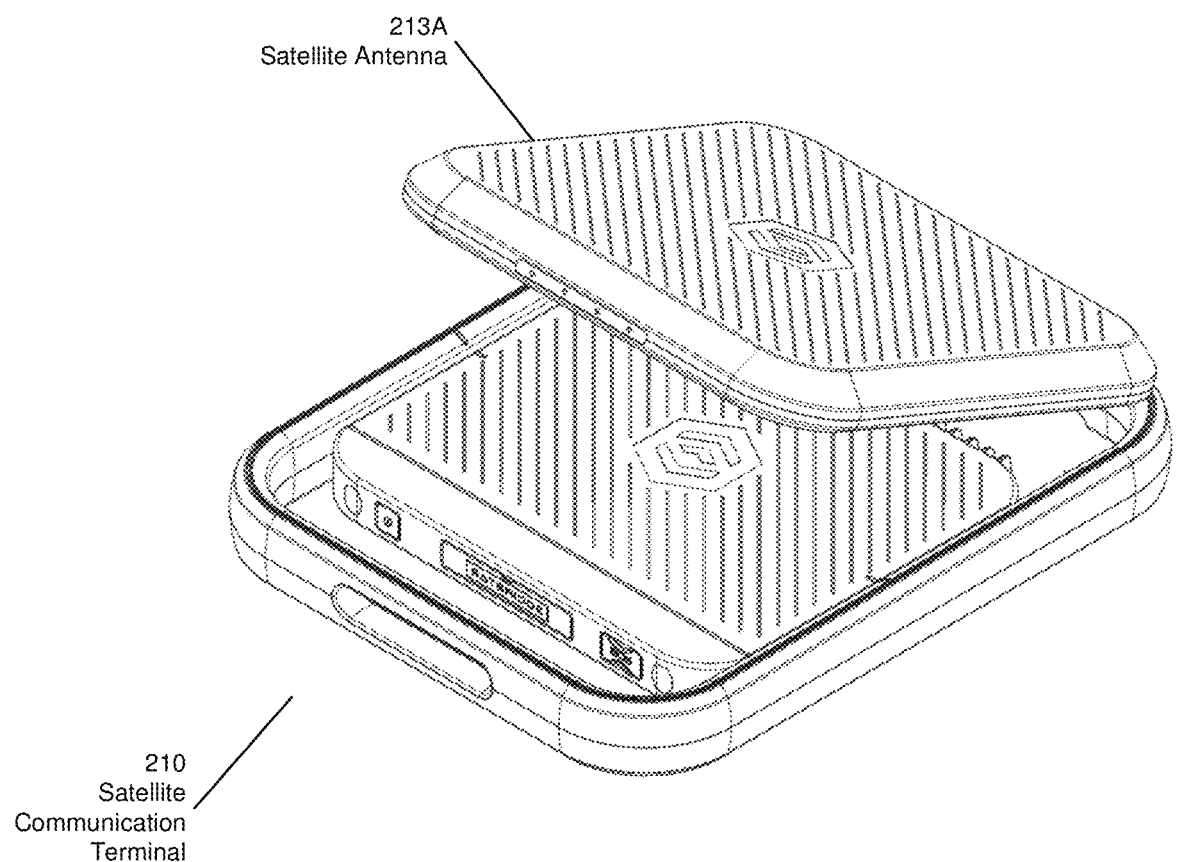

FIG. 2B shows a satellite communication terminal and satellite antenna, in accordance with one or more embodiments of the invention. The satellite antenna 213A may be a flat antenna that is oriented with respect to the satellite communication terminal 210 by a hinging connection on one edge. However, any appropriate hardware and electrical connection between the satellite communication terminal 210 and the satellite antenna 213 may be used. For example, the satellite antenna 213 may be detachable with an independent stand and cables to exchange signals and/or power with the satellite communication terminal 210.

In one or more embodiments, the satellite communication terminal 210 is configured for communications on the pause (COTP). In other words, the satellite communication terminal 210 comprises a satellite antenna 213 that maintains the satellite backhaul link 144 while the satellite communication terminal 210 is stationary (e.g., temporarily placed on a worksurface or permanently installed on a mounting surface). For example, a user may enter the field environment 100 and setup a stationary workstation with a satellite communication terminal 210.

In one or more embodiments of a COTP satellite communication terminal 210, the satellite antenna 213A is a flat antenna with a relatively fixed beam direction. The beam direction of the satellite antenna 213 may be defined as a direction of highest signal intensity, but is not limited to this definition. For example, the beam direction may be an angular range with a minimum acceptable signal level (e.g., +/−20 degree working range). In one or more embodiments, the beam direction of the satellite antenna 213A may be fixed by a radiation pattern inherent to the physical components of the antenna (e.g., size, distribution, or phase offset of one or more antenna elements 213B).

In one or more embodiments, the satellite communication terminal 210 may connect with a satellite 145 in a geostationary orbit. By rotating the satellite communication terminal 210 and adjusting the orientation of the satellite antenna 213A, the beam direction of the satellite antenna 213A may be manually steered within a predetermined angular range of the geostationary satellite 145. In this case, the satellite backhaul link 144 can be established and maintained without further interaction until the user moves the satellite communication terminal 210.

Figure 2C:
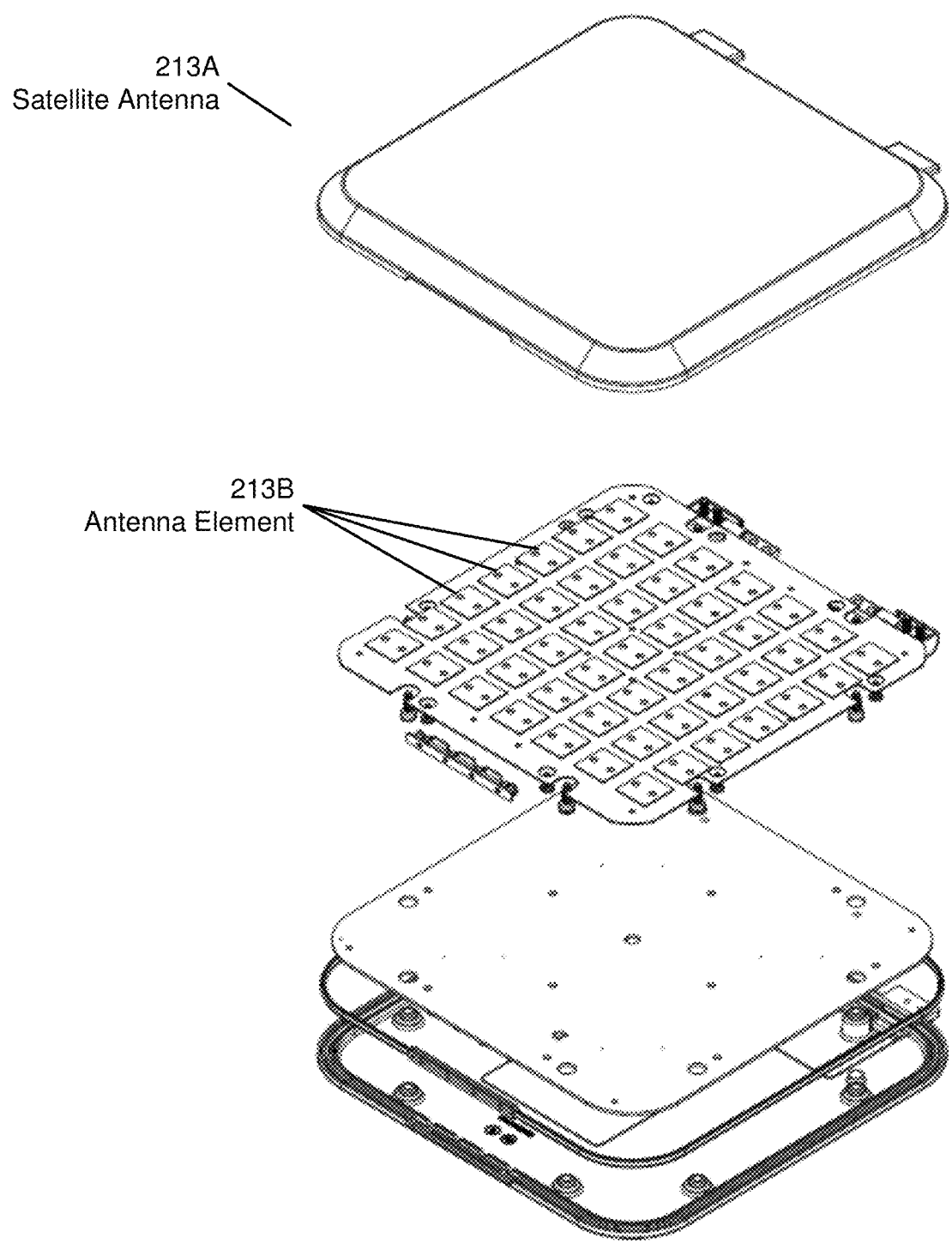

FIG. 2C shows an exploded view of a satellite antenna, in accordance with one or more embodiments of the invention. The satellite communication terminal 210 may include a flat satellite antenna 213A with a plurality of antenna elements 213B. In one or more embodiments, the antenna elements 213B may be disposed in a regular array (e.g., a rectilinear array), but the configuration of antenna elements 213B is not limited to any particular regular or irregular pattern. Furthermore, the antenna elements 213B may be grouped or independently controlled to achieve any appropriate radiation profile, as discussed below in detail with respect to FIGS. 3-7.

In one or more embodiments, the satellite communication terminal 210 is configured for communications on the move (COTM). In other words, the satellite communication terminal 210 comprises an antenna 213 that maintains the satellite backhaul link 144 while the satellite communication terminal 210 is in motion. For example, a user travelling across the field environment 100 may setup a mobile workstation (e.g., in a car, boat, or airplane) with a satellite communication terminal 210.

In one or more embodiments of a COTM satellite communication terminal 210, the satellite antenna 213A is a flat antenna comprising a plurality of antenna elements 213B that function as a phased antenna array. The beam direction of the satellite antenna 213A may be varied by manipulating the collective radiation profile of the plurality of antenna elements 213B (i.e., beam-forming). After aligning the beam direction by the beam-forming, the satellite communication terminal 210 may establish a satellite backhaul link 144 with a satellite 145 in a geostationary orbit. The satellite communication terminal 210 maintains the satellite backhaul link 144 by redirecting the beam direction to track the stationary satellite 145 in the sky as the satellite communication terminal 210 moves around the field environment 100.

Alternatively, the satellite communication terminal 210 may establish a satellite backhaul link 144 with a satellite 145 in a non-geostationary orbit. The satellite communication terminal 210 maintains the satellite backhaul link 144 by redirecting the beam direction with beam-forming to track the moving satellite 145 in the sky as the satellite communication terminal 210 moves around the field environment 100. Those skilled in the art will appreciate that a beam-forming satellite antenna 213A may be used for both COTP and COTM applications in conjunction with a geostationary or non-geostationary satellite 145.

Figure 2D:
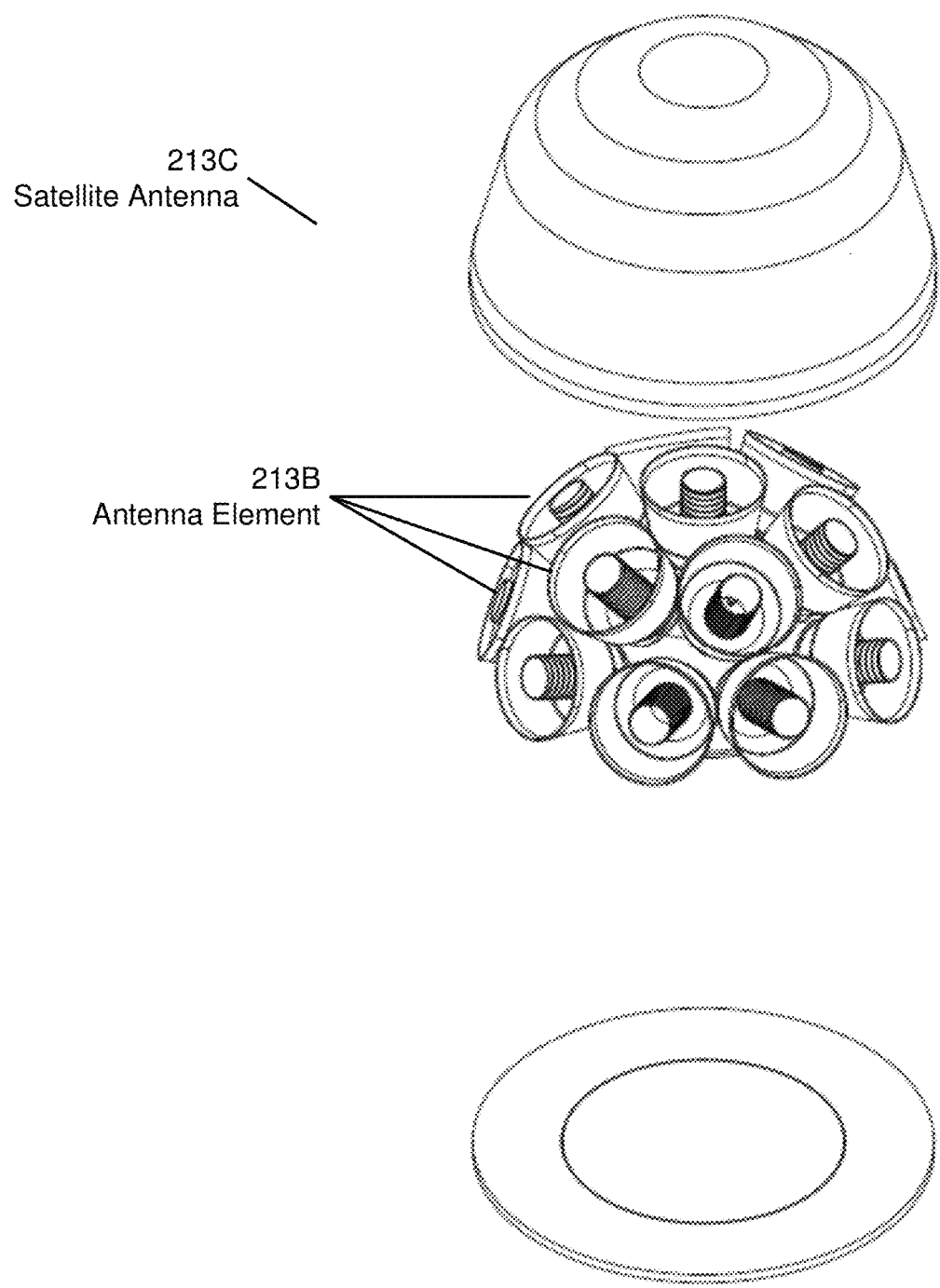

FIG. 2D shows an exploded view of a satellite antenna, in accordance with one or more embodiments of the invention. The satellite communication terminal 210 may include a satellite antenna 213C with a plurality of antenna elements 213B oriented in different directions. In one or more embodiments, the satellite antenna 213C may comprise a base and a cover to protect the antenna elements 213B from hostile conditions (e.g., broad temperature ranges, wind, rain, dust, insects and mechanical stress).

In one or more embodiments, the satellite antenna 213C may be used for both COTP and COTM applications in conjunction with a geostationary or non-geostationary satellite 145. The satellite interface 212 of the satellite communication terminal 210 may automatically select one or more antenna elements 213B of the plurality of antenna elements 213B that are optimally aligned with the target geostationary or non-geostationary satellite 145. Furthermore, the satellite antenna 213C requires minimal setup because the plurality of antenna elements 213B may be distributed to provide relatively uniform coverage in a wide range of directions, regardless of the orientation of the satellite communication terminal 210.

Figure 2E:
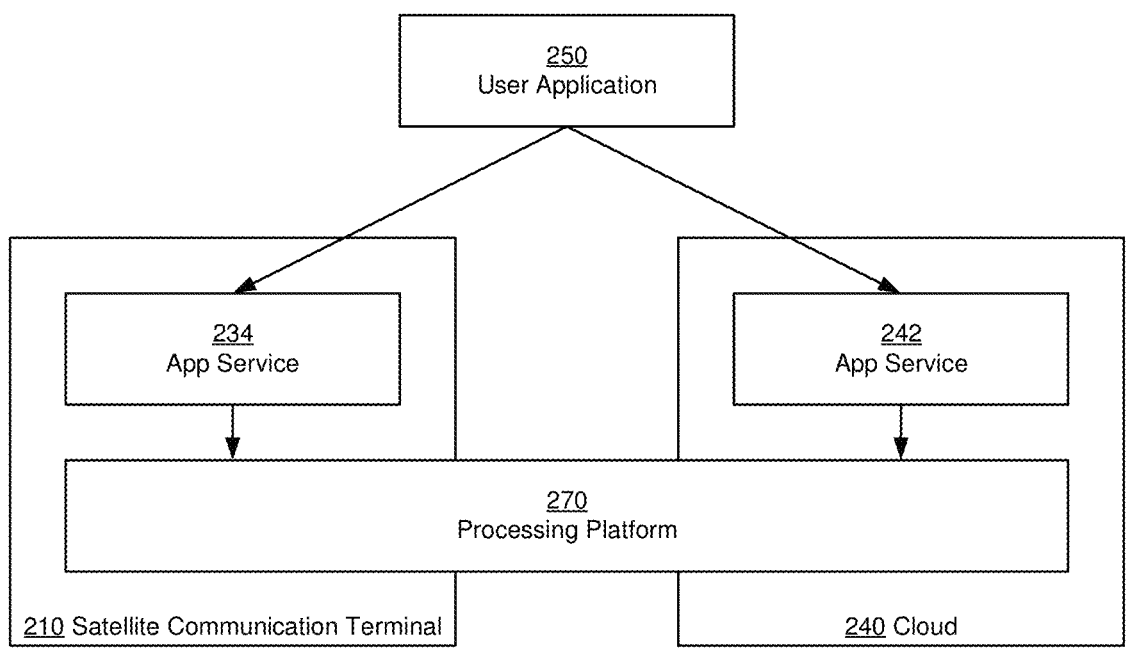

FIG. 2E shows a satellite communication terminal-cloud configuration, in accordance with one or more embodiments of the invention. The satellite communication terminal-cloud configuration includes the satellite communication terminal 210, the cloud 240, and the user application 250. A processing platform 270, jointly executing on the satellite communication terminal 270 and in the cloud 240 in a distributed manner, provides back end-support for the various devices in the field environment 100, as further described with reference to FIG. 2F. A user application 250 may be relied upon by a user to access the processing platform 270 via the satellite communication terminal 210 and/or via the cloud 240. Each of these components is subsequently described.

In one or more embodiments, services available through the processing platform 270 may include providing/exchanging data between devices in the field environment 100 or enabling the user to interact with the devices in the field environment 100, etc. The processing platform 270 may be accessed by a user using the user application 250, which may be executed on a computing device such as a smartphone 128 or a laptop 130. The user application 250 may provide a user interface that enables the user to access the processing platform 270. The user application 250 may include alert displays, status messages, data visualization capabilities, control and configuration capabilities (e.g., satellite antenna positioning and orientation instructions described below with respect to FIG. 8), but is not limited these functionalities. The user application 250 may further provide data entry fields to configure the services performed by the processing platform 270 (e.g., setting authorization parameters, validating authorization, etc.), specialized control interfaces (e.g., to control a drone 117), voice over IP (VoIP) and/or push to talk interfaces and other communication interfaces that are supported by the broadband links 120 provided by the access points 112. Alternative implementations of the user application 250 may operate on other devices in the field environment (e.g., on an audio alert device, a laptop 130, or a monitored device 104).

Depending on whether the user application 250 accesses the processing platform 270 via the satellite communication terminal 210 (i.e., part of a local network in the field environment 100) or via the cloud 240 (i.e., part of an external network connected to the cloud 240) the user application 250 may interface with the processing platform via the app service 234 of the satellite communication terminal 210 or via the app service 232 of the cloud 240. When a user is located in the field environment (e.g., directly connected to an access point 112 or the satellite communication terminal 210), accessing the processing platform 270 may be particularly low-latency because the interaction of the user's device with the satellite communication terminal 210 is local.

The satellite communication terminal 210 includes a computing device configured to execute the app service 234 to interface with one or more access points 112, the cloud 240, and the device that executes the user application 250. In one or more embodiments, the computing device of the satellite communication terminal 210 may be an embedded system that includes all components of the computing device on a single printed circuit board (PCB), or a system on a chip (SOC), i.e., an integrated circuit (IC) that integrates all components of the computing device into a single chip. The computing device may include one or more processor cores, associated memory (e.g., random access memory (RAM), cache memory, flash memory, etc.), one or more wired or wireless network interfaces (e.g., an Ethernet interface, an optical interface, a Wi-Fi interface, a Bluetooth interface, a cellular interface, etc.), and interfaces to storage devices, input and output devices, etc. The computing device of the satellite communication terminal 210 may further include one or more storage device(s) (e.g., a hard disk, an optical drive such as a compact disk (CD) drive or digital versatile disk (DVD) drive, flash memory, etc.), and numerous other elements and functionalities. In one or more embodiments, the computing device includes an operating system that may include functionality to execute the methods further described below. Those skilled in the art will appreciate that the invention is not limited to the aforementioned configuration of the computing device of satellite communication terminal 210.

The cloud 240, in accordance with one or more embodiments of the invention, may be formed by multiple/many networked computing devices. These computing devices may be geographically and organizationally distributed in any way. For example, some of these computing devices may be located in a data center, whereas other such computing devices may be individual physical or virtual servers. An exemplary computing system, as it may be used in the cloud 240, is shown in FIG. 9. One or more of the computing devices may host the processing platform 270, analogous to how the processing platform 270 is hosted on the satellite communication terminal 210. While the components of the processing platform 270 that are executing on the satellite communication terminal 210 and that are executing on a computing device in the cloud 240 may operate separately, they are interconnected via the satellite backhaul link 144, thus enabling synchronization between these components. Accordingly, the same information may be available, regardless of whether the user application 250 connects via the satellite communication terminal 210 or via the cloud 240. Temporary discrepancies may exist though, e.g., during times when the satellite backhaul link 144 is interrupted, and a synchronization is therefore unavailable. Further, because additional data processing may be performed in the cloud 240, additional data, resulting from the additional processing, may be available when connecting to the processing platform 270 via the cloud 240. Such data may, however, also be available via the satellite communication terminal 210, if synchronization via the satellite backhaul link 144 is maintained. The cloud 240 may run multiple instances of the processing platform 270 in order to support the load of many devices and/or many users. Depending on the configuration of the processing platform 270, incoming data (i.e., data received from a particular access point 112, a particular device, a particular site, or a particular customer) may be distributed between multiple instances, or may be consistently assigned to the same instance (e.g., by using a consistent hash ring configuration).

Those skilled in the art will recognize that other configurations that deviate from the configuration introduced in FIG. 2E may exist, without departing from the invention.

In one or more embodiments, a field environment 100 can only intermittently establish the satellite backhaul link 144 to the satellite 145. Therefore, the processing platform 270 may solely execute on the satellite communication terminal 210. In such a scenario, the satellite communication terminal 210 may be configured to temporarily "self-backhaul" (i.e., the satellite communication terminal 210 may collect and consolidate data and may perform some or even all of the processing that would otherwise be performed in the cloud).

In one or more embodiments, the satellite communication terminal 210 may partially or completely share one or more instances of the processing platform 270 with a hub 118, an access point 112, or a device in the field environment (e.g., a laptop 130).

All processing functionality, even functionally that would typically be provided by the satellite communication terminal 210, may be provided in the cloud 240. The configuration of the satellite communication system, with or without a hub 118, with or without access points 112, may be transparent (i.e., devices in the field environment 100 may operate in the same manner, regardless of the presence of a hub 118, access point 112, or reliable satellite backhaul link 114). Similarly, a user may experience the same satellite communication system, whether or not a hub 118, access point 112, or reliable satellite backhaul link 114 is present.

Figure 2F:
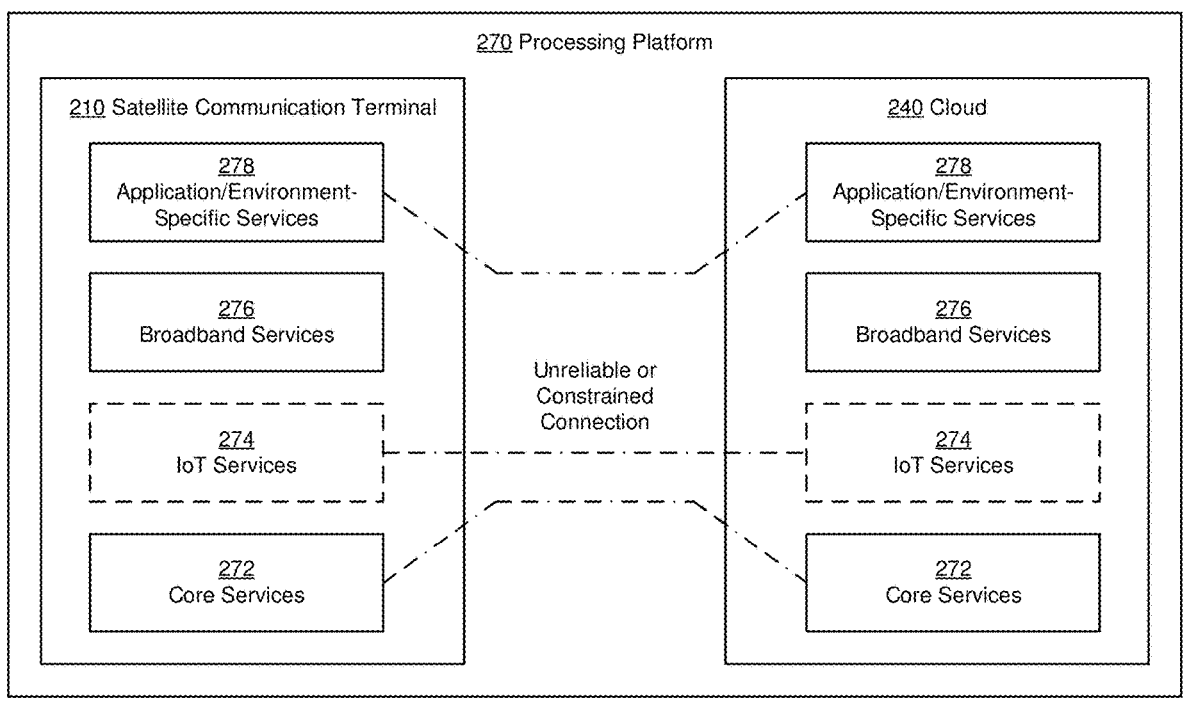

FIG. 2F shows a processing platform, in accordance with one or more embodiments of the invention. In one or more embodiments, the processing platform 270 is organized in layers. Those skilled in the art will appreciate that, any organization of services or operations executed by the processing platform may be used and that the invention is not limited to the following configuration. Further any services described herein may be shared or distributed among one or more layers.

Core services 272 provide basic functionalities such as data storage, networking, and messaging.

Above the core services 272, the optional IoT services 274 provide services specific to IoT networks, but that are not necessarily required in all applications. The IoT services 274 may include location services (e.g., GPS, TDOA or RSSI based), IoT network services, and configurations, etc.

Above the IoT services 274, the broadband services 276 provide services to manage broadband communication between a device in the field environment 100 (e.g., a monitoring device 104, an access point 112, a smartphone 128, or a laptop 130) and the connected network.

In one or more embodiments, broadband services 276 may include routing, switching, or authorizing the exchange of data. For example, broadband services 276 may comprise managing an authorization of the device or a user of the device to communicate within a local network connected to the satellite communication terminal 210 or an external network connected to the satellite 145. Authorization may be based upon credentials of the device or credentials of the user. Furthermore, authorization may control the ability of the device/user to exchange data with other devices/users in the local network or the external network.

In one or more embodiments exemplified in FIG. 1J, a satellite communication terminal 119 may support a local network utilized by multiple customers (e.g., Customers 1-4 in Network Site A 192). The satellite communication terminal 119 may authorize communication (e.g., access to data or exchange of data) between multiple devices owned by a single customer (e.g., Customer 1), but may prevent communication between different customers (e.g., limit or entirely stop communication between Customer 1 and Customers 2-4). Alternatively, authorization to communicate between different customers in Network Site A 192 may be granted if the different customers establish a mutual agreement with an owner/operator of the satellite communication terminal 119.

In one or more embodiments exemplified in FIG. 1J, the satellite communication terminal 119 in Network Site A 192 may be linked with an external network in Network Site B 194 (e.g., a remote site that may be accessed via the satellite 145 and the satellite backhaul link 144). Network Site B 194 may be exclusively utilized by Customer 1 from Network Site A 192. Accordingly, the satellite communication terminal 119 in Network Site A 192 and/or Network Site B 194 may be configured to authorize communication between all devices owned/operated by Customer 1 in both the local network (Network Site A 192) and the external network (Network Site B 194).

In one or more embodiments, the satellite communication terminal 210 may independently authorize the device/user to communicate with the cloud 240 or an external network such as the World Wide Web.

In one or more embodiments, the authorization may comprise a level of service within the local network connected to the satellite communication terminal or the external network connected to the satellite. For example, the level of service may define one or more formats of data (e.g., text data, voice data, video data) that the device/user is authorized to utilize. Furthermore, the level of service may define one or more bandwidths allocated to the device/user (e.g., bandwidth limits, data caps). An allocated bandwidth may apply to all communication by the device/user; communication by the device/user within a specific network (e.g., the local network, the external network, or some combination of networks); communication within a predetermined time period, or any other appropriate metric to manage broadband communication facilitated by the satellite communication terminal 210. Further still, the level of service may define the type of network connections the device/user is allowed to use for connecting with a network (e.g., wireless link, wired link, broadband link, IoT link, or a combination of links).

In one or more embodiments, the authorization configuration implemented by the broadband services 276 in the satellite communication terminal 210 may be mirrored in the cloud 240, other satellite communication terminals 210, a hub 118, or any other computing device.

Furthermore, broadband services 276 may further include general data services such as aggregating, filtering, fusing, compressing, encrypting data, and the like.

The topmost layer includes application/environment-specific services 272. In one or more embodiments directed to a field environment in healthcare facility, the application/environment-specific services 272 may include analysis of patient vital signs, a patient location tracking interface, etc. In one or more embodiments directed to a field environment in oilfield facility, the application/environment-specific services 272 may include pipeline operation analytics, equipment command/control interfaces, sensor monitoring/analysis, etc. Other application/environment-specific layers may be added, replaced, or removed without departing from the invention.

The processing platform 270 is modular, allowing adaptation to many applications, depending on the services required by the field environment 100.

In one or more embodiments, the services of the processing platform 270 may be available through the satellite communication terminal 210 and/or through the cloud 240. A synchronization may be performed between the services executing in the cloud 240 and the services executing on the satellite communication terminal 210, thus maintaining consistency between the satellite communication terminal 210 and the cloud 240. As long as a satellite backhaul link 144 is available, the data available through the satellite communication terminal 210 and through the cloud 340 may be identical.

However, if the satellite backhaul link 144 becomes temporarily unavailable because of an unreliable or constrained data connection, data that is accumulated (i.e., buffered) on the satellite communication terminal 210 may not be available through the cloud 240, and vice versa. A synchronization may be performed once the satellite backhaul link 144 is restored, to update the cloud 240 and the satellite communication terminal 210. Accordingly, consistent information (e.g., data, network configuration, or authorization information) is available via satellite communication terminal 210 and cloud 240.

The conventional methods for beam arrays rely on a complex gain for each antennal element to steer the antenna beam; a costly solution. In addition to hardware complexity and cost of complex gain components, the mathematics of finding the correct values for the complex gains is too sophisticated. As a result, it is difficult to do real-time computations within the resource limited terminals. In addition, conventional array structures typically rely on a uniform placement of the antenna elements. The resulting symmetry causes unwanted lobes in the antenna patterns. In methods of this invention, first, complex gain component is replaced with a quantized set of phase values, typically {0',90',180',270'}, with a static gain which is used as a tapering function to reduce the levels of grating lobes.

Prior methods are based on regular placing the antenna elements, typically antenna elements are placed on the array surface to form a grid. Such a regular placement of antenna elements results in coherent addition of the radiated wave in certain unwanted directions, causing large unwanted lobes. Such large unwanted lobes (side-beams), even if their number is small, act as bottleneck in the overall antenna performance. For example, a receiving antenna array may receive a very large interference if the wave from an interfering satellite arrives in certain direction, causing serious interruption in the reception. A better alternative would be a placement of antenna elements that would average out the good and bad conditions, resulting in reducing the severity of any such potential bottlenecks. In prior art, all the antenna elements are typically aligned in the same direction, contributing to the formation of bottlenecks in performance. It would be desirable to provide means such that, when antenna elements collectively steer the main beam towards a desired direction, the effects of different antenna elements in directions other than the direction of the main beam are different, and consequently, these effects would be averaged out upon combining in the air. Such an averaging would provide a balance in directions other than the direction of the main beam, and thereby would reduce the possibility of having a few outlier directions that would cause undesirable bottlenecks.

To achieve such an averaging effect, in methods of this invention, antenna elements are placed irregularly, including rotating some of the elements. However, some regularity conditions are imposed on the irregular structure, making it possible to characterize the geometrical structure in terms of a manageable number of parameters that would allow optimizing the overall irregularity towards mitigating bottlenecks. Parametric model is constructed, for example, by reliance on concentric circles for antenna placement. In this setup, the parameters specifying the geometry of the array structure are optimized off-line, in conjunction with the quantized phase shift values, in order to shape the antenna pattern. Shaping antenna pattern means, e.g., (1) maximize the main lobe gain, (2) reduce levels of undesirable lobes; (3) impose a null in certain direction (dynamically, meaning that both the main lobe direction and null direction are steerable), (4) improve the cross polarization coupling (reduce leakage between RHC and LHC polarizations).

Result of the off-line computations are saved in memory forming a lookup table within the terminal (on-line computed and reprogrammable look-up table). To select the best pattern, the lookup table is indexed by an input vector containing variables that govern the selection of best pattern (shaping the antenna pattern), example are: (1) Time of day and GPS position of the terminal, together specifying what the best antenna pattern may be at any given time. (2) A vector specifying the current pattern, together with measured data specifying the direction of movement and speed of the satellite with respect to the terminal, together pointing to the table entry specifying the best choice for the pattern to follow the current one. (3) Vector measured by an auxiliary set of antennas, placed within the main array, and used to find/monitor the next satellite before breaking the current connection.

One or more embodiments include 3-bits phase shifters for each antenna element. Another embodiment includes 3-bits phase shifters for each antenna element, plus the ability to bypass a subset of the antennas. Another embodiment partitions the set of antennas into several subsets, apply a discretized phase shifter for each antenna element, combines (RF combining) the signals from antenna elements within each subset, apply a complex gain to the combined RF signal corresponding to each subset, and once again combines the resulting signals (RF combining) prior to down-conversion. Another embodiment partitions the set of antennas into several subsets, use a discretized phase shifter for each antenna element, combines (RF combining) the signals from antenna elements within each subset, uses a separate receive chains (down-conversion, A/D) for each composite signal corresponding to each subset, processes (combines) the different base-band signals to optimize the performance of the equivalent antenna array. Another embodiment partitions the set of antennas into several subsets, apply a discretized phase shifter for each antenna element, combines (RF combining) the signals from antenna elements within each subset, down-coverts the resulting combined signals, apply a complex gain to the resulting down-converted analog signal corresponding to each subset, combines the resulting weighted analog signals, e.g., using an operational amplifier, and then passes the result through Analog-to-Digital Conversion for digital base-band processing.

Circular polarization, de-facto standard for satellite connections, is formed by adding the vertical and horizontal polarizations with 90' relative phase shift. In prior art, this 90' phase shift is applied at the RF, creating an antenna with a single terminal. The shortcomings of the prior art, which this invention tackles, are as follows: (1) it is not possible to dynamically change between RHC and LHC, (2) The coupling between RHC and LHC will be low because, in general, a RHC signal will be orthogonal to a LHC only if the incident wave propagates orthogonal to the antenna surface, and its vertical and horizontal signals have the same magnitude. For example, consider a RHC array which is placed on the XY plane and its main beam is focused along the Z-axis. Then, if an incident LHC wave propagates along the Z axis, the RHC antenna array will not receive any signal from the incident LHC wave. In practice, antenna arrays are built to enable steering their beams, which means in vast majority of scenarios encountered in practice, the conditions for perfect isolation between RHC and LHC, as explained in the earlier example, will not be valid. For receiving arrays, this potentially results in a large amount of interference from a nearby LHC satellite to leak into a RHC receiver array. Similarly, for a transmitting RHC array with a beam steered sideway, the array can radiate a significant LHC wave, causing unwanted interference, and potentially violating the underlying regulatory requirements. (3) Traditional circularly polarized antennas are designed (and set on the factory floor) to operate either as RHC, or LHC. It is desirable that the selection between RHC and LHC can be still performed after the antenna has left the factory. The disclosed invention solves these shortcomings; provides the means to support multiple beams; provides the means to improve cross coupling (leakage between RHC and LHC polarizations), and provides the means to create the effect of virtual tilting of the antenna element.

Methods of this invention result in the following benefits with respect to the prior art. (1) LHC vs. RHC selection is done at base-band, and the antenna can indeed listen simultaneously to one LHC and one RHC satellites. LHC vs. RHC selection can be also through combining two RF signals; first, an RF signal V is obtained by combining vertical polarizations from different antenna elements (upon adjusting their relative phase values), and an RF signal H is obtained by combining horizontal polarizations from different antenna elements (upon adjusting their relative phase values). Then, signals V and H are each multiplied (in the RF domain, for example using a vector modulator) by a complex gain to adjust their relative magnitude and phase, the two resulting signals are combined, and the outcome is processed by a single baseband chain. (2) By measuring angles of incident, separately over the horizontal and vertical polarizations and their variations over time, we can estimate the speed of satellite in two directions (spanning the X-Y plane of earth surface), and thereby measure the direction and speed of satellite with respect to the ground terminal. This helps in tracking the satellite.

In summary, using methods of this invention in conjunction with: (1) antenna elements with 2 or 4 terminals improves the RHC/LHC isolation, (2) antenna elements with 4 terminals creates the effect of virtual tilting, (3) antenna elements with 2 or 4 terminals improves signal-to-noise ratio using maximum ratio combining, as well as cancels the effect of undesirable incoming signals (nulling interference).

Figure 3A:
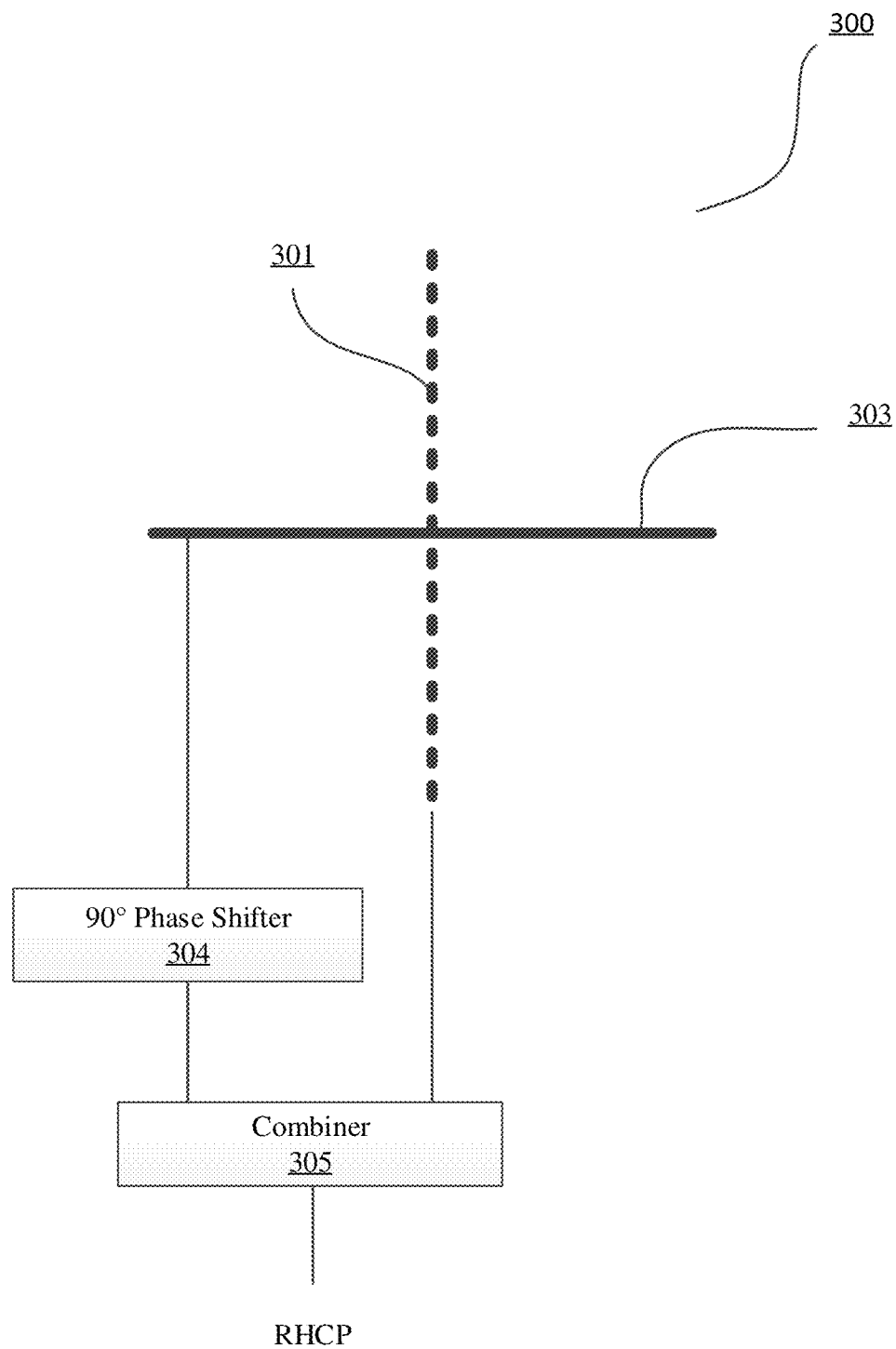
FIGS. 3A and 3B illustrate the principle of receiving RHCP and LHCP signals, respectively, according to one or more embodiments.
Figure 3B:
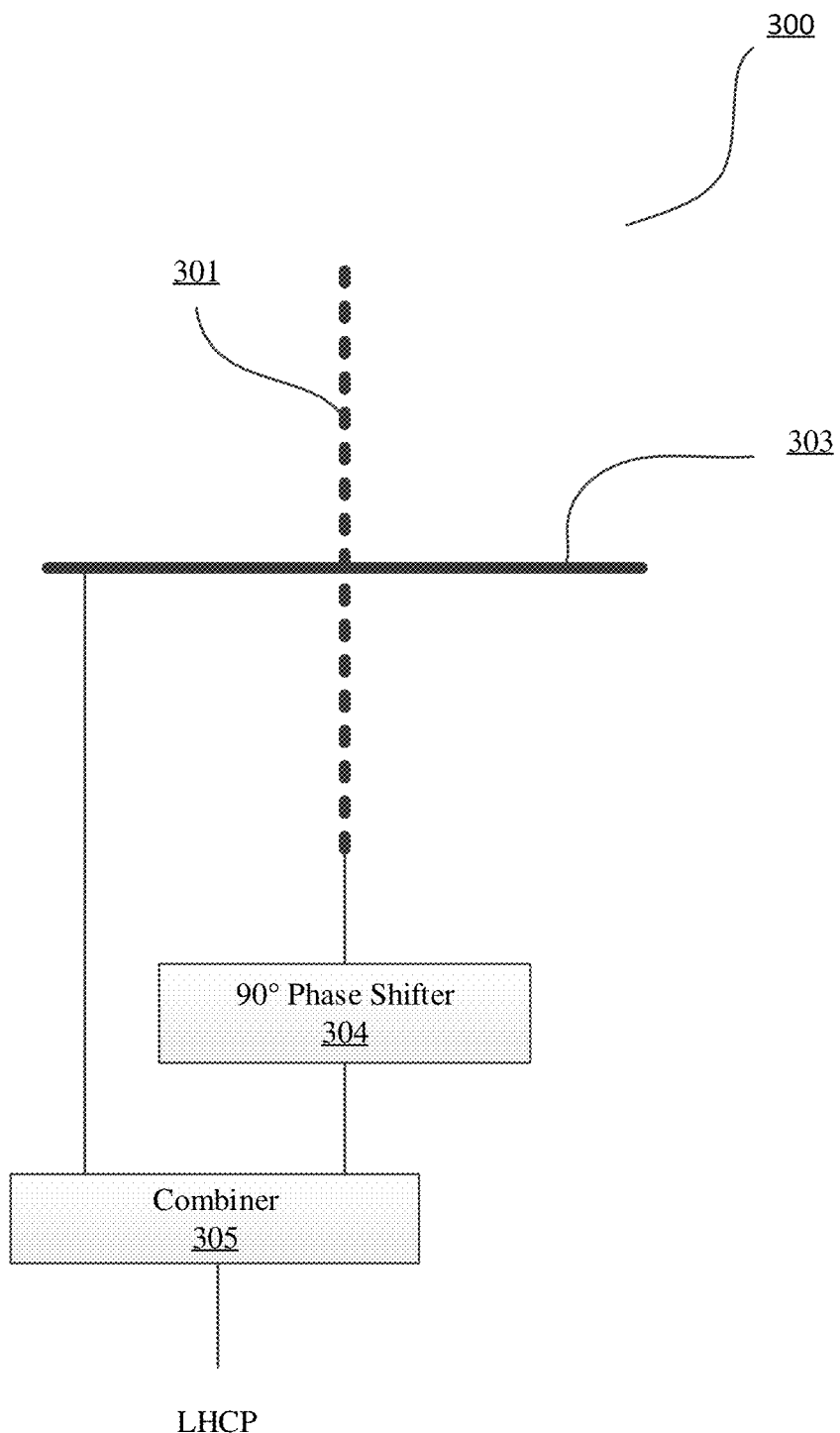

FIGS. 3A and 3B illustrate the principle of receiving RHCP and LHCP signals, respectively, according to one or more embodiments. In these figures, an antenna 300, which may be a patch antenna or an antenna of any other suitable types, may include a vertical terminal 301 (illustrated in a dashed line) and a horizontal terminal 303 (illustrated in a solid line). The two terminals may be in the shape of a dipole or a slot, or may be of L-shape, U-shape, disc-shape, or any other suitable shape. The vertical terminal 301 is configured to capture vertically polarized wireless signals, and the horizontal terminal 303 is configured to capture horizontally polarized wireless signals.

As shown in FIG. 3A, a horizontally polarized signal received by the horizontal terminal 303 undergoes a 90-degree phase shifter through phase shifter 304 before being combined at combiner 305 with the vertically polarized signal received by the vertical terminal 301. As such, an RHCP signal is formed, assuming the horizontally polarized signal and the vertically polarized signal have the same magnitude.

As shown in FIG. 3B, a vertically polarized signal received by the vertical terminal 301 undergoes a 90-degree phase shifter through phase shifter 304 before being combined at combiner 305 with the horizontally polarized signal received by the horizontal terminal 303. As such, an LHCP signal is formed, assuming the horizontally polarized signal and the vertically polarized signal have the same magnitude.

Figure 3C:
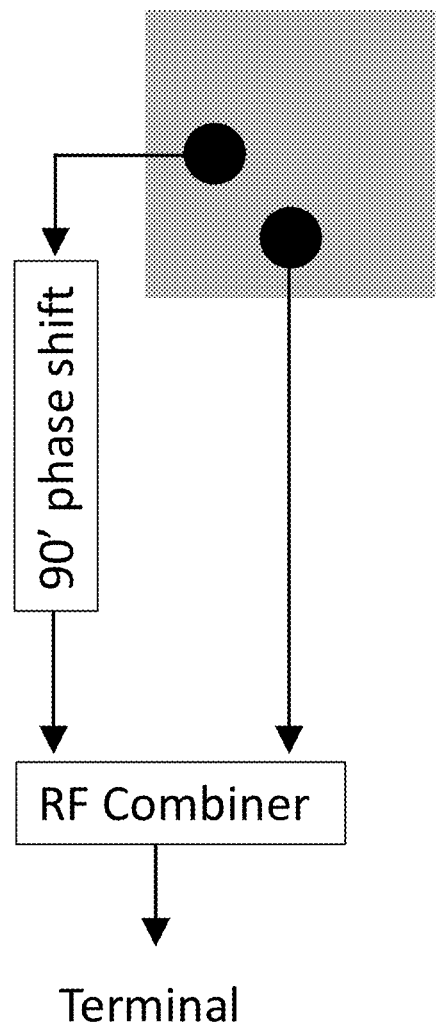
FIGS. 3C-3E illustrate the forming of one or more effective antenna using one physical patch antenna.
Figure 3D:
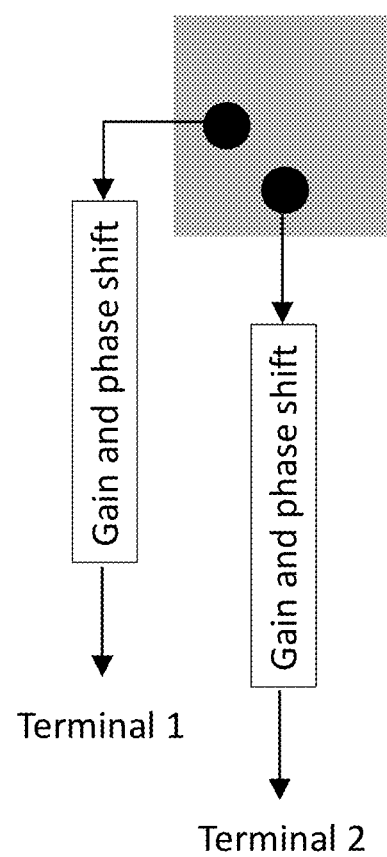
Figure 3E:
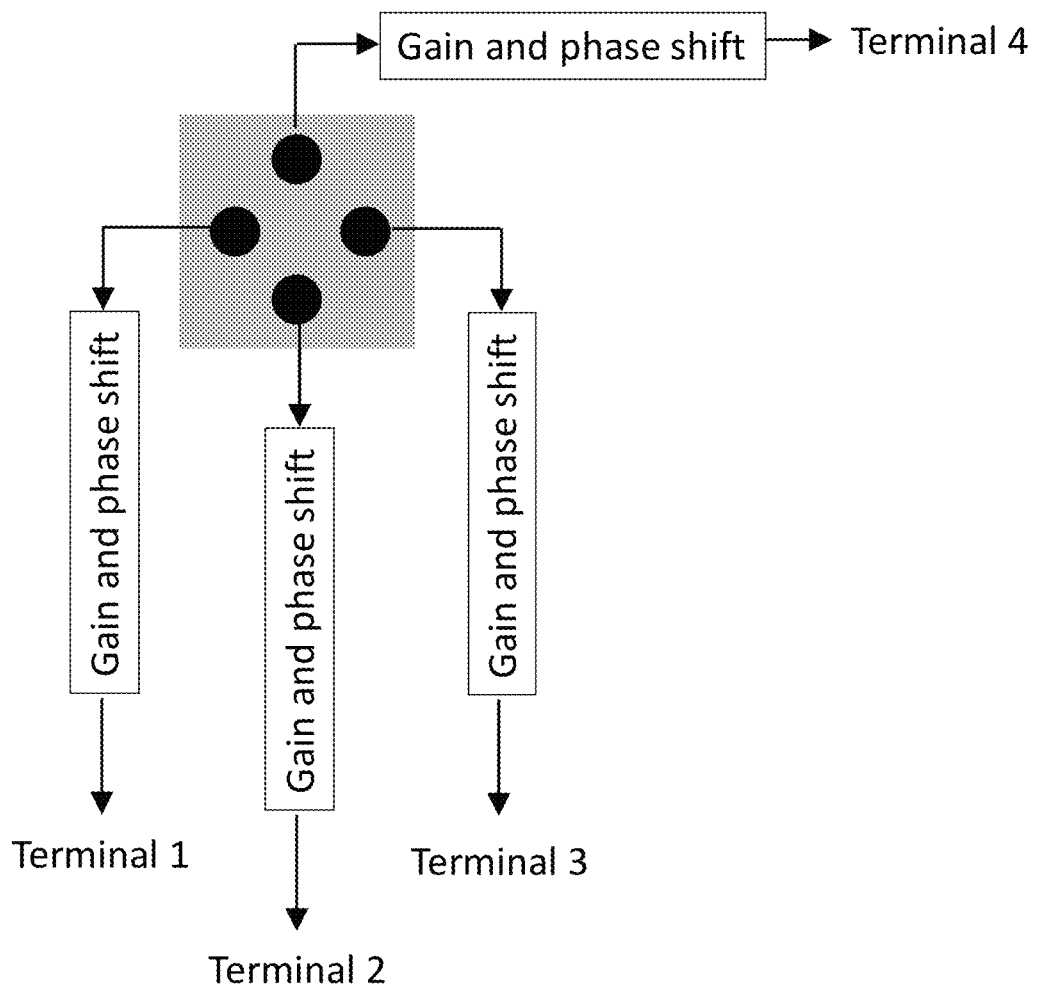

More generally, in methods of disclosed herein, antenna elements include a physical body, and each physical body may be equipped with multiple terminals. As such, antenna terminals may be separately excited, and a physical antenna may result in multiple "effective antenna" elements that share the same physical antenna structure. FIG. 3C depicts a patch antenna constructing a circular polarized antenna. In this case, a single physical antenna has created a single effective antenna. FIG. 3D depicts a patch antenna, wherein a single physical antenna has created two effective antennae. FIG. 3E depicts a patch antenna, wherein a single physical antenna has created four effective antennae. In explaining the methods of this invention, the word "effective antenna element" and "antenna element" are interchangeably used, where there are no chances of confusion. Note that FIGS. 3C, 3D and 3E are depicted to represent receive mode, and it will be clear to those skilled in the art that a similar structure would be applicable for transmit mode.

In methods of this invention, the operation of antenna beamforming is realized by using a hierarchy to gradually form a weighted sum of signals corresponding to the available effective antenna elements. To explain the concept, an example, in which the hierarchy is composed of two stages, will be provided next. In a first stage of the weighting hierarchy, antenna beamforming is performed by applying an adjustable phase shift, possibly plus a constant gain factor, to the signal from each effective antenna element. Then, the set of effective antenna elements are partitioned into some subsets, and the RF signals from the effective antenna elements within each subset are combined to obtain a set of combined RF signals. Then, in the second stage of the weighting hierarchy, a complex gain is applied to each such combined RF signal, and finally the results are combined once again.

Figure 3F:
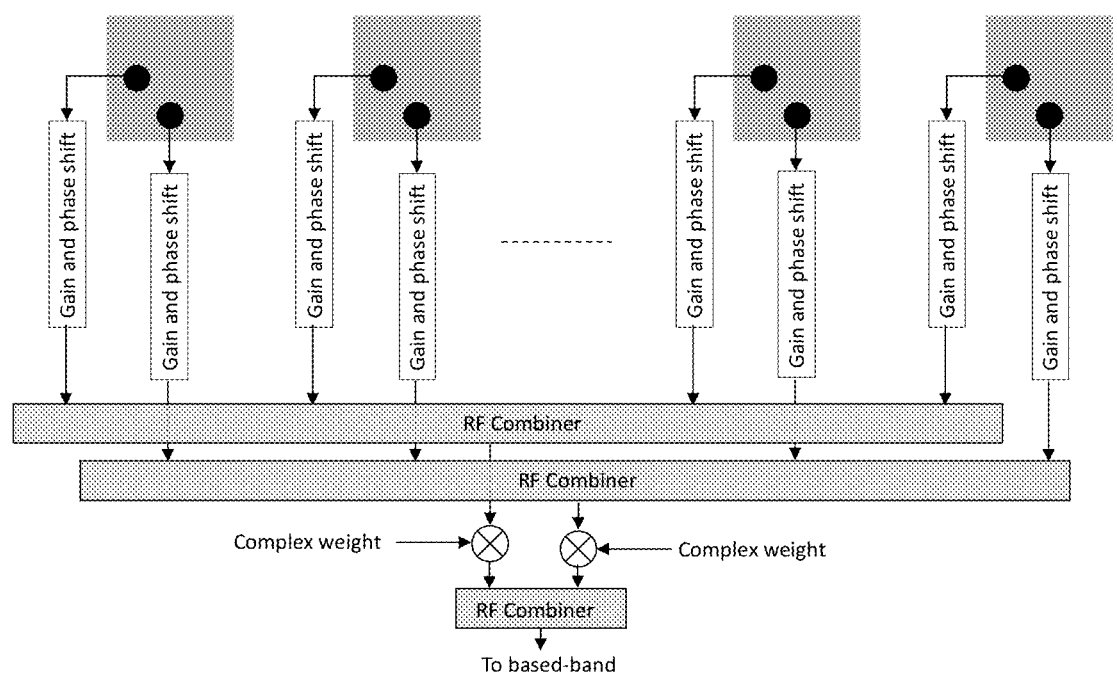
FIGS. 3F and 3G show two examples of using different weighting in different states of weighting hierarchy.
Figure 3G:
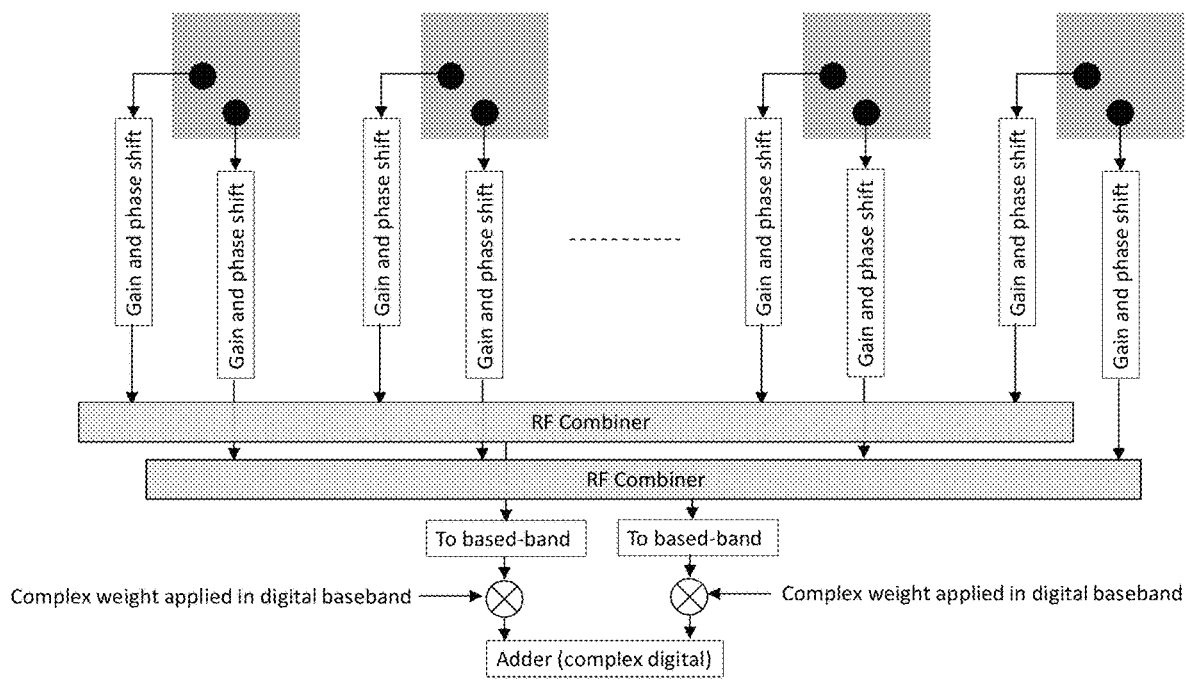

To reduce the complexity, in the methods of this invention, some of the weight factors are realized in the form of a change in the phase, and some are realized in the form of changing both phase and magnitude (complex multiplication). To further reduce the complexity, in the methods of this invention, the method used for weighting differs in different stages of the weighting hierarchy. FIGS. 3F and 3G show two examples. In FIG. 3F, each physical antenna forms two effective antennae corresponding to its vertical polarization and its horizontal polarization. This divides the set of effective antennae into two subsets, one corresponding to the vertical polarization and the other one corresponding to the horizontal polarizations. The signals from antenna terminals in the first subset, which includes all vertical polarizations, are combined in the RF domain, and likewise, signals from antenna terminals in the second subset, which includes all horizontal polarizations, are combined in the RF domain. In the next stage of the hierarchy, these two signals should be weighted and combined once again, in order to complete the weighted sum. In methods of this invention, this operation is performed in two different manners, shown in FIG. 3F and FIG. 3G. In FIG. 3F, the RF signal obtained by combining vertical polarizations is passed through a complex multiplication in the RF domain, and likewise, the RF signal obtained by combining horizontal polarizations is passed through a complex multiplication in the RF domain, and then the results are combined in the RF and the final outcome is brought to base-band. Complex multiplication in the RF domain can be implemented, for example, using an RF vector modulator. On the other hand, in FIG. 3G, the RF signal obtained by combining vertical polarizations and the RF signal obtained by combining horizontal polarizations are separately brought to base-band and the final stage of the hierarchy in forming the weighted sum is performed in the base-band using digital numbers.

In some other embodiments, the grouping of the antenna elements is more sophisticated, wherein, grouping of the antenna elements into subsets is performed by dividing the array into a number of sub-arrays, and dividing the antenna elements accordingly. It will be clear to individuals skilled in the art that the aforementioned grouping mechanisms, one based on the polarizations and the other one based on dividing the array into subarrays, can be combined, and accordingly the number of stages in the weighting hierarchy increases.

In some embodiments of this invention, the effective antenna corresponding to vertical polarization and the effective antenna corresponding to horizontal polarization, are each equipped with their own phase shifter, but to reduce the complexity, the two phase shifters are controlled with a shared set of control lines. This means, the phase selected for the effective antenna corresponding to vertical polarization and the phase selected for the effective antenna corresponding to horizontal polarization will be the same.

More generally, different embodiments of this invention are based on realizing, and benefiting from, the following features and abilities:

First Feature: The ability to separately observe the combined signal corresponding to different "subsets of effective antennae" prior to combining these signal in the next stage of the weighted sum hierarchy, wherein, to observe the combined signal corresponding to each "subset of effective antennae", typically, the corresponding combined signal is brought to base-band and measurements are performed in the base-band.

Second Feature: The ability to separately select the weights corresponding to different "subsets of effective antennae" prior to combining them, wherein, separate selection of the weight corresponding to each "subset of effective antennae" can be performed: (1) in the RF domain using complex multiplication, for example using a vector modulator for each multiplication operation, or (2) in base-band by separately bringing each combined signal, corresponding to each of the "subsets of effective antennae", to base-band.

In some embodiments of this invention, the first feature is deployed to: (1) Detect the direction of the movement of the satellite with respect to the terminal. (2) Detect the direction from the terminal to a second satellite, while maintaining the connection to a first satellite, for the purpose of conducting soft or hard hand-off (make before break). (3) Detect direction to an interfering satellite, while maintaining the connection to a desired satellite.

In some embodiments of this invention, the second feature is deployed to: (1) Decide to support a RHC polarization vs. a LHC polarization after leaving the factory floor. (2) Simultaneously listen to a RHC polarization signal and to a separate LHC polarization signal. (3) Perform Maximum Ratio Combining (MRC) by adjusting the weights corresponding to different combined signals from different subsets of effective antennae in order to improve the signal to noise ratio. (4) Perform nulling an interfering satellite by adjusting the weights corresponding to different combined signals from different subsets of effective antennae, while at the same time improving the signal to noise ratio to a desired satellite. (5) Improving isolation between LHC and RHC polarizations. (6) Perform Maximum Ratio Combining (MRC), instead of equal gain combining used in prior art in dealing with circular polarizations, by adjusting the weight corresponding to the subset formed from vertical polarizations vs. the weight corresponding to the subset formed from horizontal polarizations.

Figure 4:
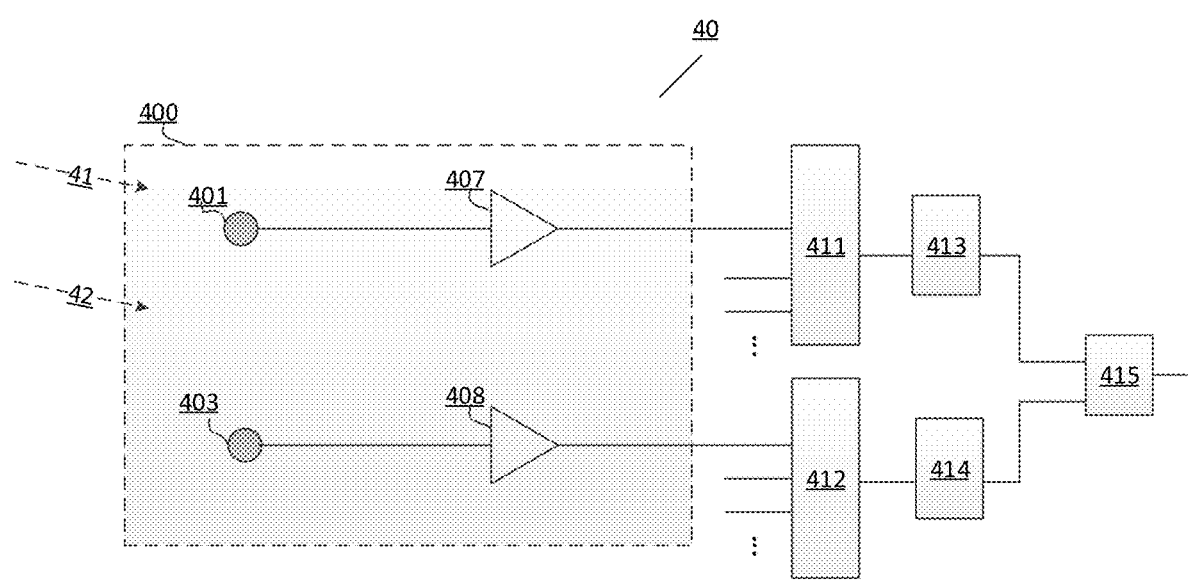
FIG. 4 illustrates an example of antenna system according to one or more embodiments, wherein each antenna includes two terminals.

FIG. 4 illustrates an example of an antenna system according to one or more embodiments. Each antenna 400 includes two terminals. For the purpose of simplification, only one antenna 400 is shown in detail in FIG. 4. Those skilled in the art will appreciate the antenna system 40 may include a plurality of antennas 400 arranged in an array, where the other antennas may or may not be identical to the illustrated antenna 400.

In FIG. 4, the antenna 400 communicates wirelessly with one or more objects using electromagnetic (EM) waves 41 and 42. The one or more objects may be satellites, aircrafts, space stations, etc. Such communication may allow the antenna system 40 to track the location, moving direction, or status of the object(s), and may allow the antenna system 40 to control the object(s).

Further, as shown in FIG. 4, the EM waves may include a vertically polarized wireless signal 41 and a horizontally polarized wireless signal 42. The antenna 400 may include one first terminal 401 that receives the vertically polarized wireless signal 41 at a radio frequency, and one second terminal 403 that receives the horizontally polarized wireless signal 42 at the radio frequency. In one or more embodiments, each of these wireless signals 41 and 42 may be pre-modulated to a carrier frequency before being wirelessly transmitted from the one or more objects and received by the corresponding terminal.

Each antenna 400 may include circuit modules 407 and 408 that apply complex gains to the received horizontally/vertically polarized wireless signals 41 and 42, respectively. The complex gains are chosen for maximum ratio combining (MRC) for increasing signal-to-noise (SNR) ratio.

Continuing with FIG. 4, the antenna system 40 may include a first signal combining circuit 411 that combines the vertically polarized wireless signals received by the first terminal(s) 401 of the antenna(s) 400 to obtain a combined vertically polarized signal. Likewise, the antenna system 40 may include a second signal combining circuit 412 that combines the horizontally polarized wireless signals received by the second terminal(s) 403 of antenna(s) 400 to obtain a combined horizontally polarized signal.

In one or more embodiments, the antenna system 40 may include a first frequency converting circuit 413 that converts the combined vertically polarized signal to a baseband vertically polarized signal operating at a baseband frequency different from the radio frequency. Likewise, the antenna system 40 may include a second frequency converting circuit 414 that converts the combined horizontally polarized signal to a baseband horizontally polarized signal operating at the baseband frequency. For example, the frequency converting circuits 413 and 414 may each be a demodulation circuit that demodulates the received signal from RF carrier frequency to baseband frequency which is lower than the RF carrier frequency.

The antenna system 40 may further include a baseband processing circuit 415 having a processor. The baseband processing circuit 415 may apply a 90-degree phase shift to either the baseband vertically polarized signal or the baseband horizontally polarized signal, and then combine the two. As described earlier with reference to FIGS. 3A and 3B, the baseband processing circuit 415 may selectively obtain an RHCP signal or an LHCP signal.

Figure 5A:
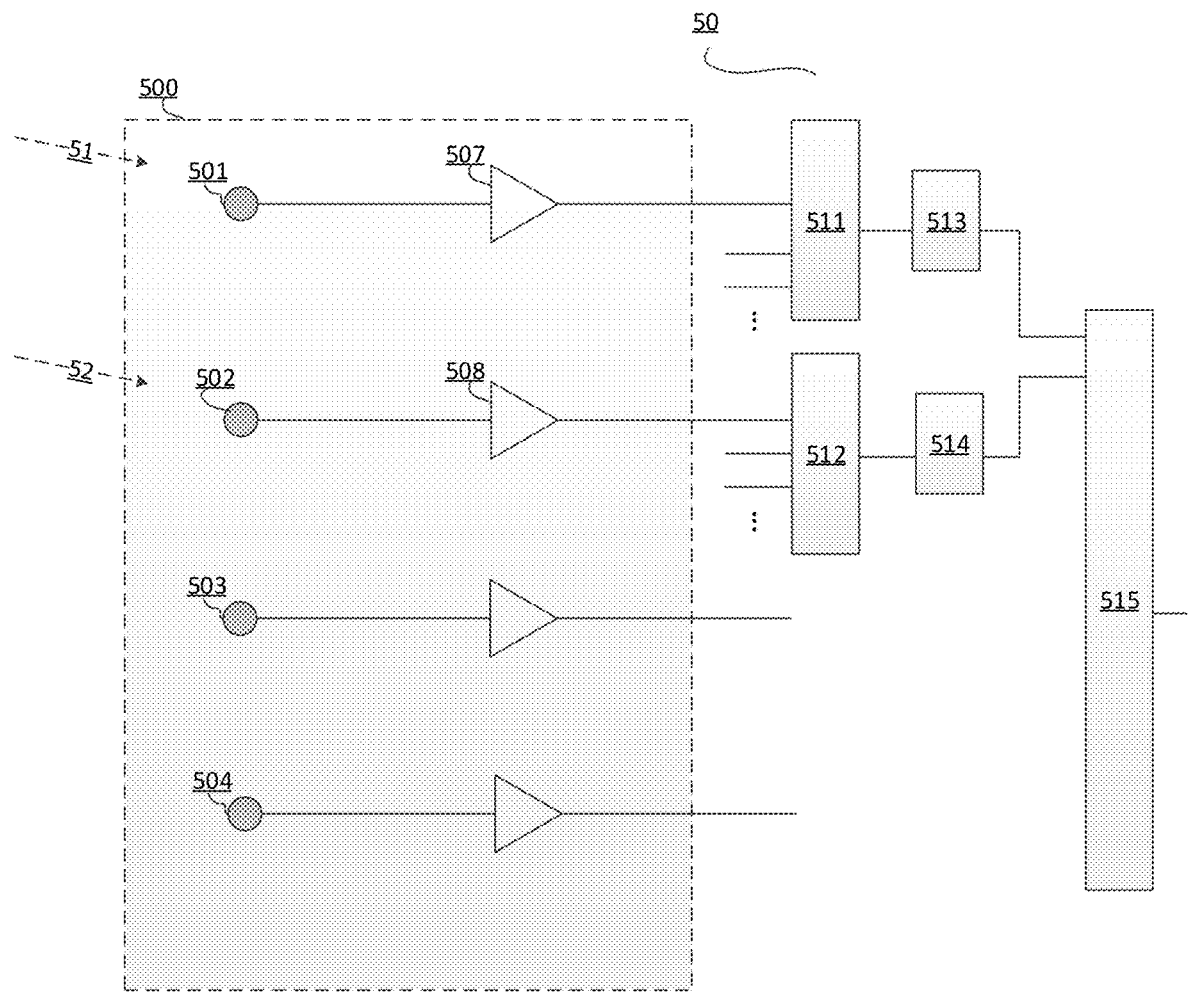
FIGS. 5A and 5B illustrate two examples of antenna system according to one or more embodiments, wherein each antenna includes four terminals.
Figure 5B:
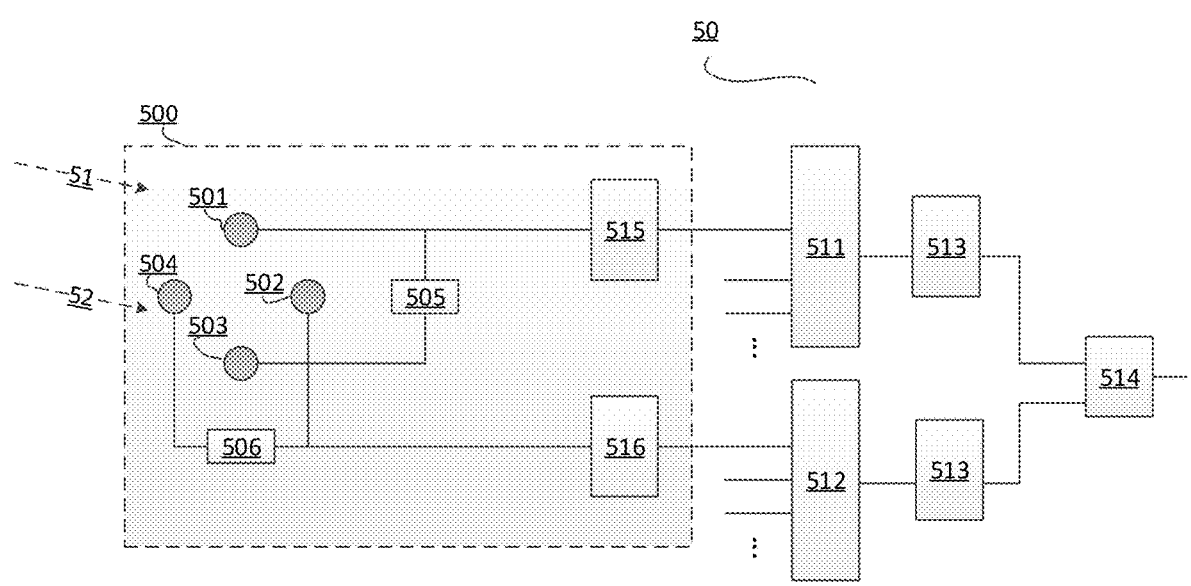

FIGS. 5A and 5B illustrate examples of an antenna system according to one or more embodiments, where each antenna includes four terminals. The antenna systems 50 illustrated in FIGS. 5A and 5B are very similar to that in FIG. 4, except the antenna illustrated 500 has four terminals 501, 502, 503, and 504. Terminals 501 and 503 may receive vertically polarized signals, and terminals 502 and 504 may receive horizontally polarized signals. FIG. 5B differs from FIG. 5A in that instead of applying complex gains using circuit modules such as 507 and 508, phase shifters 515 and 516 may be used. For example, the phase shifters 515 and 516 may be 3-bit shifters. In this configuration, the magnitudes of the received horizontally polarized wireless signals 41 and 42 are not changed. Further, elements 505 and 506 may be 180-degree RF phase shifters that will be described later.

Those skilled in the art will appreciate that while FIG. 5A-5B show one antenna 500 with four terminals, there may be a plurality of antennas with two, four, or any suitable number of terminals arranged in an array in the antenna system 50. Further, the phase shifts are applied by selecting a phase value from a discrete set of possible phase shifts. Such phase shifters may be any number of bits (e.g., 2, 3, 4, 8, 6, etc.) suitable to reduce the number of required phase shifts (enable using simple phase shifter circuitry) while achieving the desired performance.

In satellite communications, it may be desirable to be able to track two satellites simultaneously. For example, when communication is about to be handed over from a first satellite to a second satellite, it may be desirable to establish connection with the second satellite first, without losing connection with the first satellite. This is called "make before break." With the above-described configurations, a four-terminal antenna may be able to designate two terminals for receiving signals from an RHCP satellite, and the other two terminals for receiving signals from an LHCP satellite. As such, one or more embodiments of the invention may support seamless transition between a RHCP satellite and a LHCP satellite in a simple and low cost manner without losing existing communication. It will be clear to those skilled in the art that the seamless transition can be from a RHCP satellite to a RHCP satellite, from a LHCP satellite to a LHCP satellite, or from a LHCP satellite to a RHCP satellite.

Specifically, the antenna array may be divided into a primary array and an auxiliary array. The auxiliary array may be made up of a smaller subset of terminals arranged in a particular geometric configuration. The primary array may continue existing communication until the handover process is complete and may include a greater number of antennas than the auxiliary array to ensure stable communication quality. On the other hand, the auxiliary array may simultaneously track the first satellite and the second satellite. For example, antennas in the auxiliary array may search for a synchronization signals or a pilot signal to find the second antenna and perform necessary handshake procedures until connection is fully established with the second antenna.

Figure 6A:
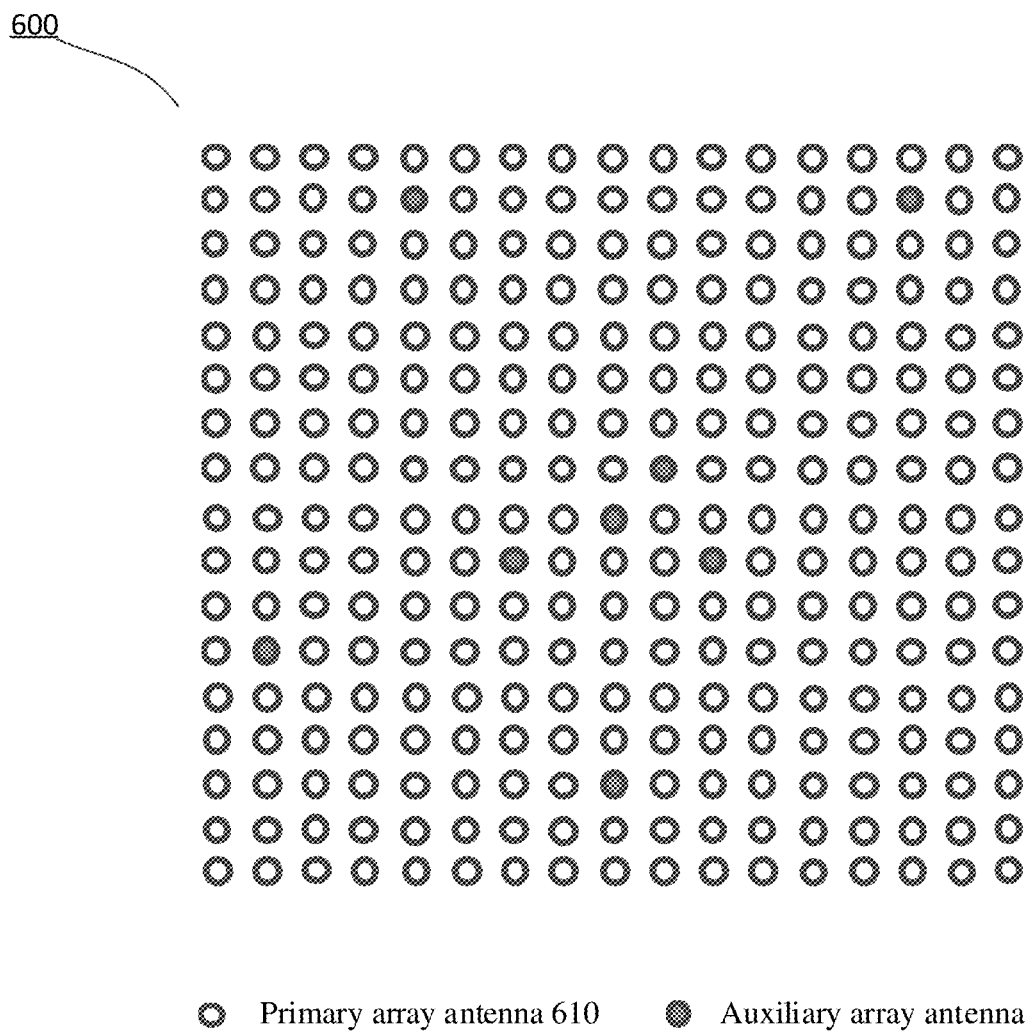
FIG. 6A illustrates an example of dividing an 8×8 antenna array into a primary array and an auxiliary array according to one or more embodiments.

FIG. 6A illustrates an example of dividing an 8×8 antenna array 600 into a primary array 610 and an auxiliary array 620 according to one or more embodiments. As shown in FIG. 6A, 8 antennas out of the 64 antennas in the array 600 are selected as members of the auxiliary array 620. All of the antennas in the primary array may each have two terminals, while all of the antennas in the auxiliary array may each have four terminals. It is also possible that all of the antennas in the primary array and the auxiliary array may each have four terminals, while two terminals of each antenna in the primary array are disconnected/unused.

It is noted that, in selecting auxiliary array antennas, geometrical symmetries may be avoided. This is because geometrical symmetries may cause the auxiliary array to be unable to tell the real direction of incident signals of the second satellite from a symmetrical image of the real direction. Geometrical symmetries may also cause undesirable grating lobes. For example, an elevation angle may be mistaken for the same angle plus 90 degrees.

With the above concern, the auxiliary array antennas 620 are arranged in a non-uniform manner in FIG. 6A. That is, when observed from any direction in a 360-degree circle, the auxiliary array 620 displays a unique arrangement pattern facing the observer.

Figure 6B:
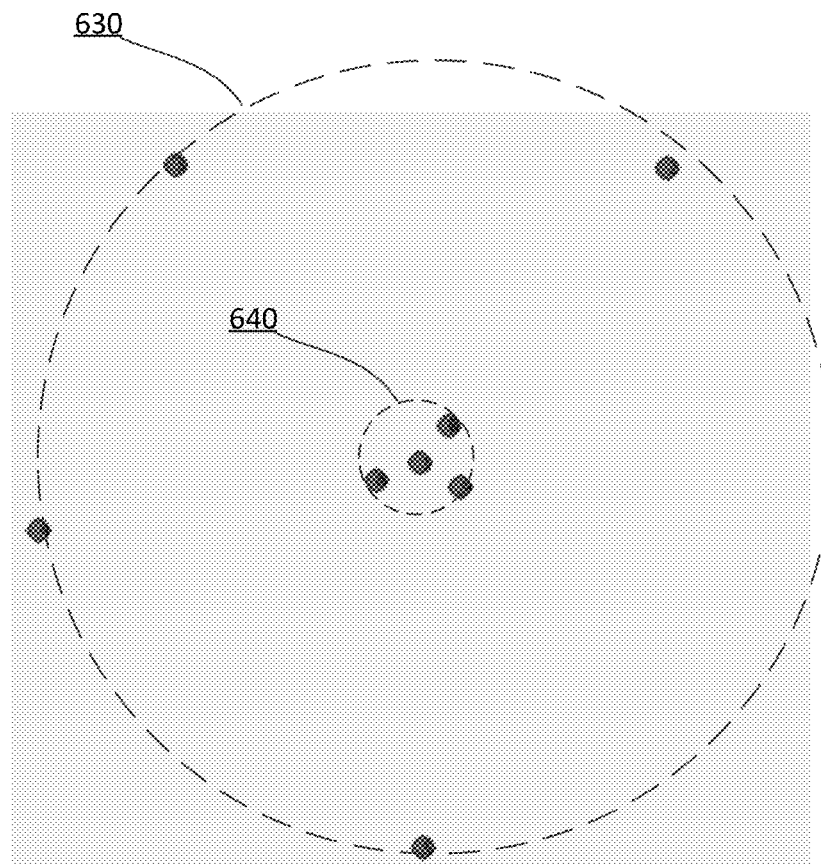
FIG. 6B provides a more detailed illustration of arrangement of the auxiliary array in FIG. 6A.

FIG. 6B provides a more detailed illustration of arrangement of the auxiliary array in FIG. 6A. As shown in FIG. 6B, the antennas in the auxiliary array may be disposed in two rings 630 and 640, where the inner ring 640 has a radius that is less than that of the outer ring 630. The small radius of the inner ring 640 may be helpful for reducing grating lobes, while the large radius of the outer ring 630 may be helpful for improving detection precision, by reducing the beamwidth of the pattern.

The arrangement of auxiliary array antennas may be optimized using the Nelder-Mead simplex method. The method is chosen based on the following grounds:

First, there is no need for approximating any form of derivative. In other words, this method tries to find the optimum point only by evaluating the cost function for different points on a polygon in the space of all optimization parameters and moves towards the optimum point based on the results of evaluations. Second, because there is no need to approximate any derivative, this method is fast. Also, the method may be implemented in a stable form on cheap processors.

Parameters used in the optimization method may include: the radius of the inner ring 640, the radius of the outer ring 630, the position of each antenna on the inner ring 640 (the angle), and the position of each antenna on the outer ring 630 (the angle).

Figure 7:
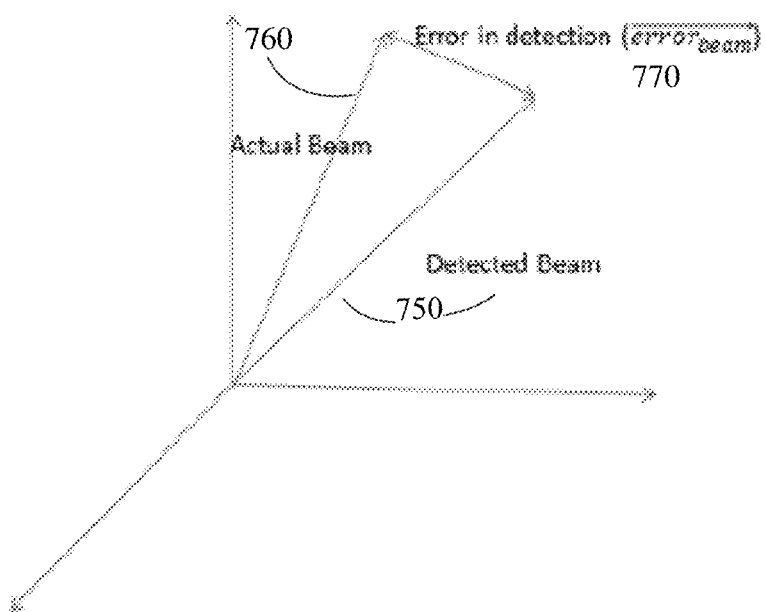
FIG. 7 illustrates the cost function used to optimize the arrangement of the auxiliary array.

The cost function of this optimization method may be the expected value of the normalized distance 770 between the tip of a vector with length one and directed towards the detected direction 750 for the incident beam and the actual direction 760, as illustrated in FIG. 7. The average distance may be considered. In the event any misdetection happens due to grating lobe, this cost function may increase drastically as there will be a 90-degree difference between the direction of the detected beam 750 and the actual one 760.

Figure 8:
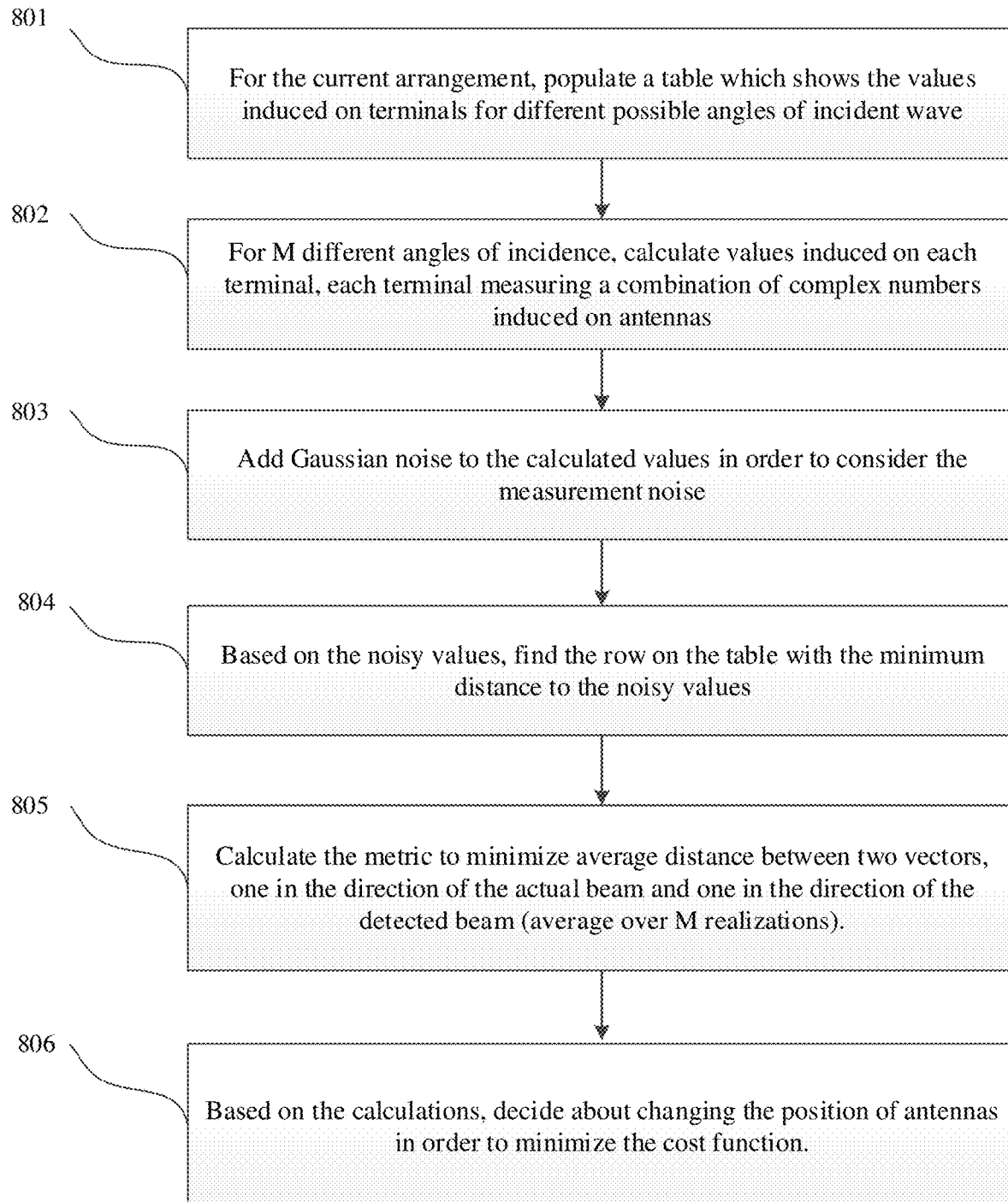
FIG. 8 is a flowchart that describes the steps for optimizing the arrangement of the auxiliary array according to one or more embodiments.

FIG. 8 illustrates the optimization procedure in accordance with one or more embodiments. In step 801, for the current arrangement, a table is populated which shows the values induced on terminals for different possible angles of incident wave. In step 802, for M different angles of incidence, calculate values induced on each terminal (each terminal measuring a combination of complex numbers induced on antennas). Next, Gaussian noise is added to the calculated values in order to consider the measurement noise (step 803). In step 804, based on the noisy values, the row on the table with the minimum distance to the noisy values is identified. In step 805, calculate the metric to minimize average distance between two vectors one in the direction of the actual beam and one in the direction of the detected beam (average over M realizations). Lastly, based on the result of evaluation, a decision is made about changing the position of antennas in order to minimize the cost function (step 806). The optimized position may not be exactly at the positions at which there is an antenna element in the array. In this case, after finding the optimized positions, the antenna elements in the array which are the closest to the optimized positions may be chosen as the auxiliary array.

After optimizing the geometrical arrangement of the auxiliary array, the auxiliary array may be configured to detect the angle of incident wave by looking into a lookup table. The lookup table may be stored in a memory and include a plurality of angles at which the auxiliary array receives signals, and pre-calculated vectors of signals received by the auxiliary array and multiplied by an Hadamard matrix.

FIG. 9 is an example of the lookup table. As shown in FIG. 9, the left two columns represent a plurality of azimuth and elevation angles at which the auxiliary array receives signals. For each given combination of azimuth and elevation, each antenna i (i=1, 2, . . . N) receives a signal represented by a complex number. The antenna system then multiplies the complex number by a corresponding element in an N-by-N Hadamard matrix, and saves the results $C_i$ in the lookup table. The complex numbers $C_i$ are pre-calculated/pre-measured when the arrangement of the auxiliary array is optimized, and are used as a reference when the auxiliary array is to detect the incident angle of a signal received from, e.g., the second satellite.

During operation, when an auxiliary array with N antennas receives a signal with unknown incident angle, each antenna in the auxiliary array reads the signal represented as a complex number. As such, a first N-by-1 vector is formed. The first N-by-1 vector is then multiplied by an N-by-N Hadamard matrix to obtain a second N-by-1 vector. It should be noted that the multiplication by a Hadamard matrix entails changing the signs of the components (according to rows in the Hadamard matrix) and summing up the results. On the other hand, in the RF domain, changing the sign of each component and summing up the components may be performed using simple RF structures such as elements 505 and 506 in FIG. 5. Specifically, changing the sign may be achieved by switching between two different transmission lines differing in length by half of the wave length, or by switching between the two secondary outputs in a center tapped transformer with the original signal feeding the primary. Summing up multiple RF components may be performed using an RF combiner. Methods of the embodiments described herein may rely on this observation to realize the effect of the multiplication by the Hadamard matrix in the analog RF domain. A controller may be used to adjust the signs of the components according to subsequent rows of the Hadamard matrix, and a down-converter followed by an analog to digital conversion may be used to bring the result of the summation to digital base-band. The controller may scan through the rows one after the other, starting from the first row of the Hadamard matrix to its last row, and then going back to the first row and following another cycle. Upon reading one round of the rows of the Hadamard matrix, the corresponding baseband samples are gathered to form an instance of the second N-by-1 vector and the resulting values are then used to point to an entry in a pre-computed lookup table, which stores the data related to the direction of arrival. By comparing the second N-by-1 vector with the values saved in the lookup table, the entry that is closest to the first N-by-1 vector may be found, and the angles associated to this entry may be determined as the angle of incident wave.

Figure 10B:
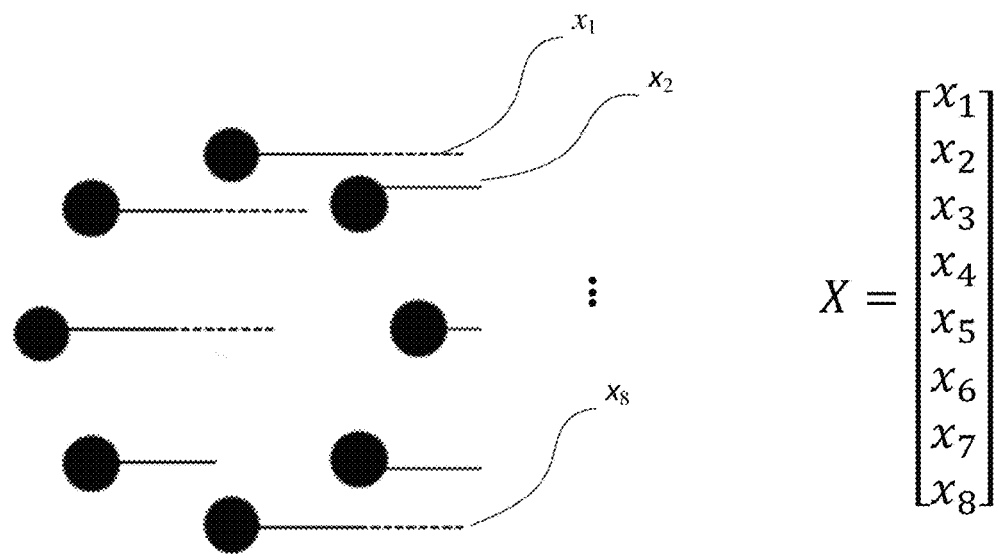
FIG. 10B illustrates the forming of an 8×1 vector based on complex signals received by the auxiliary array antennas according to one or more embodiments.
Figure 10C:
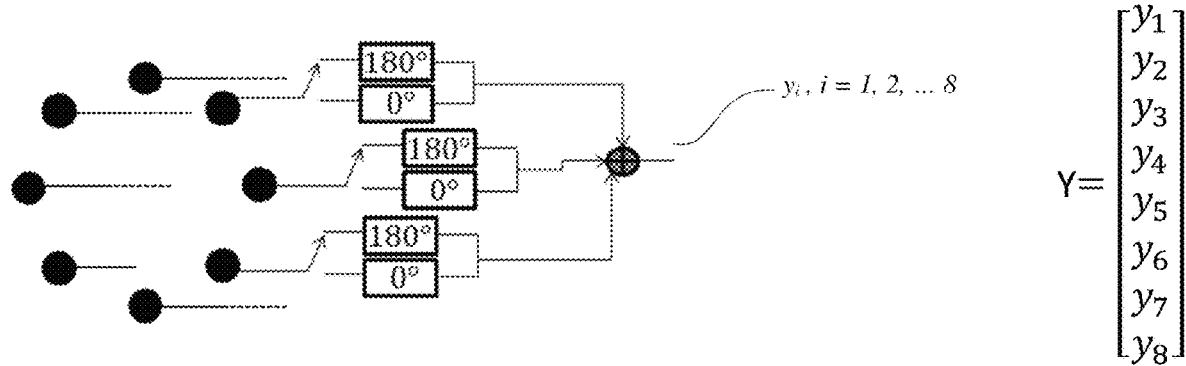
FIG. 10C illustrates the generation of another 8×1 vector by multiplying the 8×8 matrix in FIG. 8A by the 8×1 vector in FIG. 8B according to one or more embodiments.

FIGS. 10A-10C provide an example of the above-described steps, with N=8. In FIG. 10A, an 8-by-8 Hadamard matrix H is given. In FIG. 10B, $x_1, x_2, \ldots x_8$ are complex numbers read from the antennas of the auxiliary array, and an 8-by-1 vector X is formed. By multiplying matrix H by vector X, an 8-by-1 vector Y is obtained as Y=H·X.

As shown in FIG. 10C, because elements in an Hadamard matrix are either +1 or −1, the calculation of each element $y_i$ of vector Y is equivalent to applying a 0-degree or a 180-degree phase shift to the signal read by each antenna and then adding the signals together. If an element of vector X is multiplied by +1, then the phase shift is 0-degree. If an element of vector X is multiplied by −1, then the phase shift is 180-degree.

After vector Y is obtained, vector Y is compared with entries in the lookup table that store pre-calculated values. The entry closest to vector Y is selected, and the associated angle is determined as the angle of incident wave.

Figure 11:
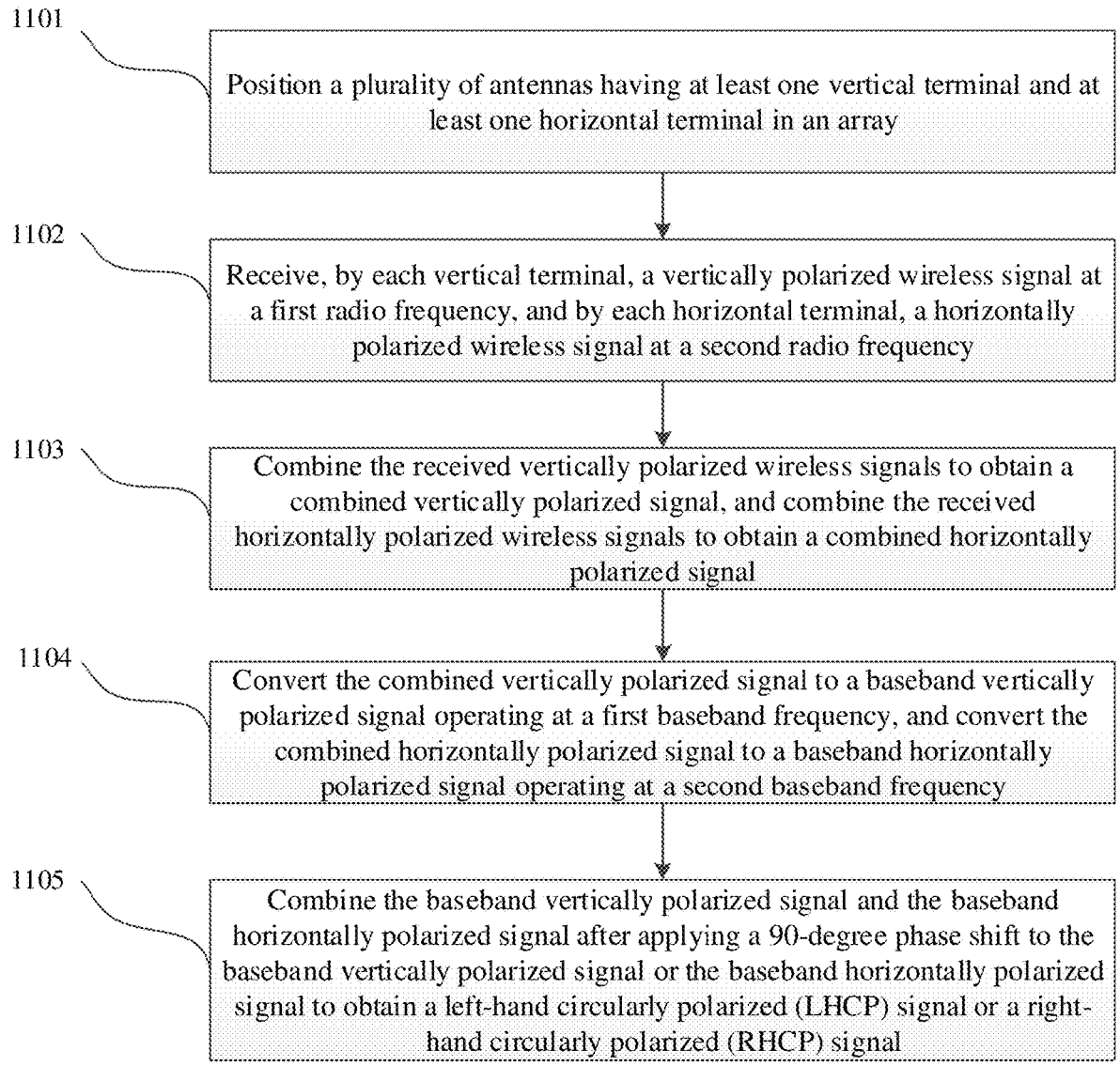
FIG. 11 is a flowchart describing a method for receiving and processing wireless signals using an antenna system according to one or more embodiments.

FIG. 11 is a flowchart describing a method for receiving and processing wireless signals using an antenna system according to one or more embodiments. In step 1101, a plurality of antennas are disposed in an array, each antenna comprising one or more vertical terminals and one or more horizontal terminals. In step 1102, each vertical terminal receives a vertically polarized wireless signal at a radio frequency, and each horizontal terminal receives a horizontally polarized wireless signal at the radio frequency. In step 1103, the received vertically polarized wireless signals are combined to obtain a combined vertically polarized signal, and the received horizontally polarized wireless signals are combined to obtain a combined horizontally polarized signal. In step 1104, the combined vertically polarized signal is converted to a baseband vertically polarized signal operating at a baseband frequency, and the combined horizontally polarized signal is converted to a baseband horizontally polarized signal operating at the baseband frequency. In step 1105, the baseband vertically polarized signal and the baseband horizontally polarized signal are combined after applying a 90-degree phase shift to the baseband vertically polarized signal or the baseband horizontally polarized signal to obtain a left-hand circularly polarized (LHCP) signal or a right-hand circularly polarized (RHCP) signal.

Figure 12:
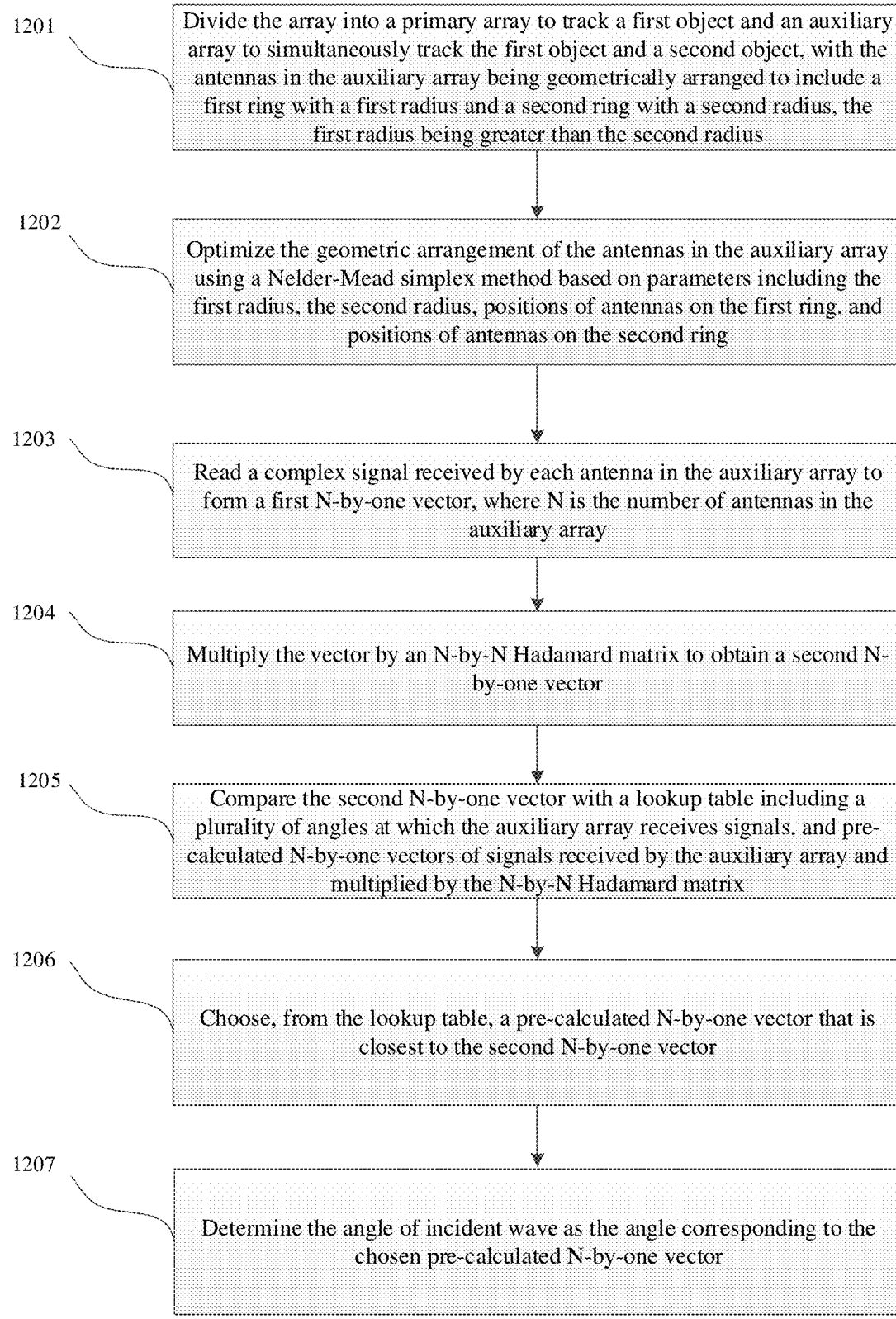
FIG. 12 is a flowchart describing further steps for detecting the angle of incident signals according to one or more embodiments.

FIG. 12 is a flowchart describing further steps for detecting the angle of incidence signals according to one or more embodiments. In step 1201, the antenna array is divided into a primary array to track a first object and an auxiliary array to simultaneously track the first object and a second object, wherein the antennas in the auxiliary array are geometrically arranged to include a first ring with a first radius and a second ring with a second radius, the first radius being greater than the second radius. In step 1202, the geometric arrangement of the antennas in the auxiliary array is optimized using a Nelder-Mead simplex method based on parameters including the first radius, the second radius, positions of antennas on the first ring, and positions of antennas on the second ring. In step 1203, a complex signal received by each antenna in the auxiliary array is read to form a first N-by-one vector, where N is the number of antennas in the auxiliary array. In step 1204, the first N-by-one vector is multiplied by an N-by-N Hadamard matrix to obtain a second N-by-one vector. In step 1205, the second N-by-one vector is compared with a lookup table, wherein the lookup table includes a plurality of angles at which the auxiliary array receives signals; and pre-calculated N-by-one vectors of signals received by the auxiliary array and multiplied by the N-by-N Hadamard matrix. In steps 1206 and 1207, a pre-calculated N-by-one vector that is closest to the second N-by-one vector is chosen from the lookup table, and the angle associated with the chosen vector is determined as the angle of incident wave.

While the antenna system described herein is used for signal reception in the above-described embodiments, one of ordinary skill in the art would appreciate that the antenna system as claimed may also be used for signal transmission in a similar manner.

The above-described embodiments of the invention may be advantageous over prior art. Specifically, conventional techniques combine vertical components and horizontal components received by each antenna at RF stage. These techniques thus do not support switching between RHCP and LHCP without changing antenna hardware. In contrast to prior art, the above-described configurations move the combination of vertical components and horizontal components to baseband stage, allowing the baseband processor to freely switch between RHCP and LHCP, thereby increasing flexibility.

Further, conventional techniques have drawbacks when the received wireless signals are incident to the antenna in a non-perpendicular direction. In this situation, the vertical and horizontal components may have different magnitudes. Because conventional techniques apply equal gains to each antenna, the resulted RHCP and LHCP signals may see increased noise due to poor isolation between vertical components and horizontal components. In contrast, the above-described configurations allow for maximum ratio combining which is effective in reducing noise.

Further, in order to track a second object, conventional techniques need to include extra antennas in the array. Because of there are spatial constraints and regulatory requirements on grating lobes and antenna distances, conventional techniques are often costly while the performance is often not satisfactory. In contrast, embodiments of the present invention designate a small number of antennas as an auxiliary array without changing the array structure or introducing extra antennas, thereby reducing cost while improving performance.

Figure 13:
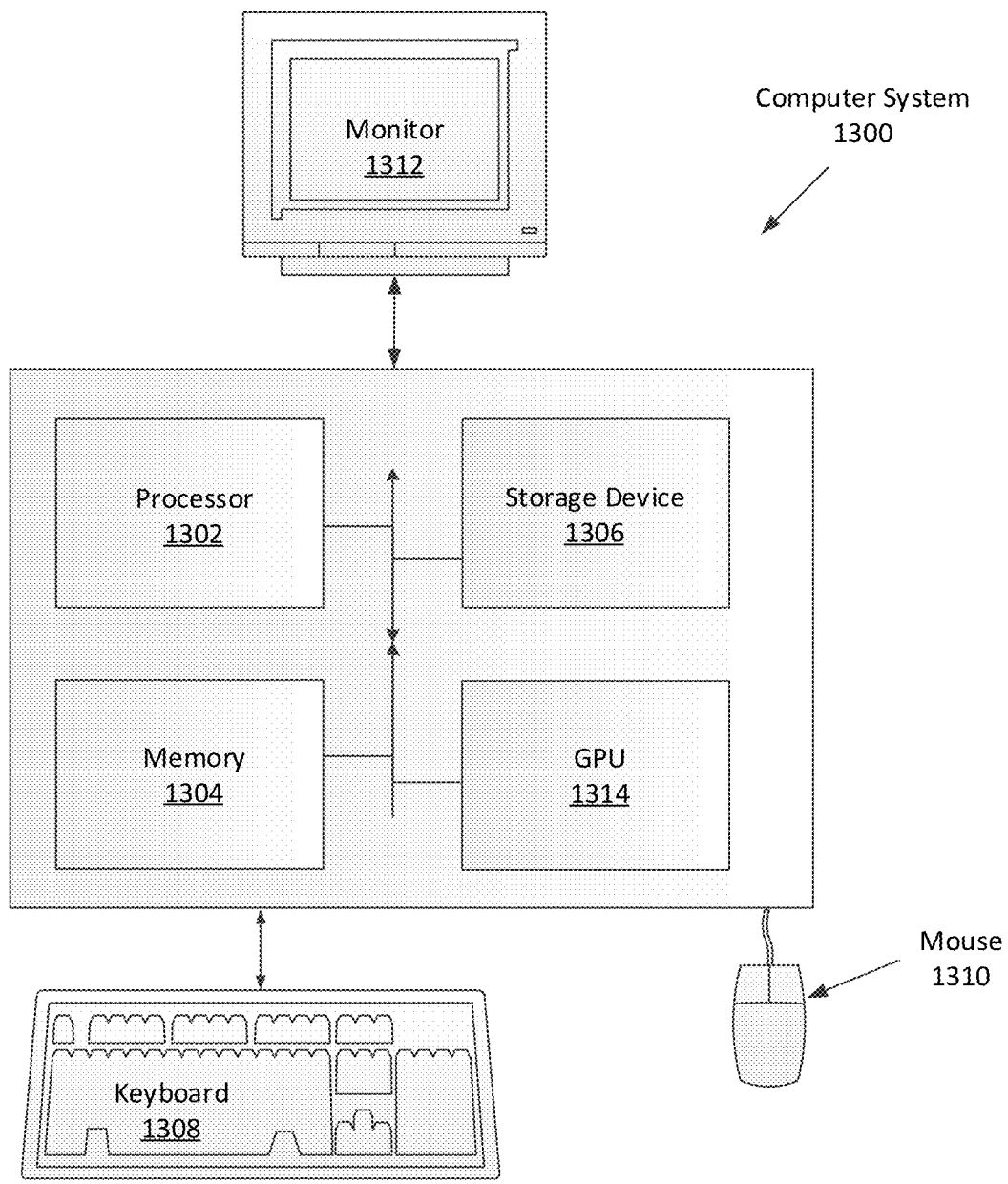
FIG. 13 illustrates a computer system on which one or more embodiments may be implemented.

Embodiments of the invention may be implemented on virtually any type of computer regardless of the platform being used. For example, as shown in FIG. 13, a computer system 1300 includes one or more processor(s) 1302, associated memory 1304 (e.g., random access memory (RAM), cache memory, flash memory, etc.), a storage device 1106 (e.g., a hard disk, an optical drive such as a compact disk drive or digital versatile disk (DVD) drive, a flash memory stick, etc.), a Graphic Processing Unit (GPU) 1314, and numerous other elements and functionalities typical of today's computers (not shown). In one or more embodiments of the invention, the processor 1302 is hardware. For example, the processor may be an integrated circuit. The computer system 1300 may also include input means, such as a keyboard 1308, a mouse 1310, or a microphone (not shown). Further, the computer system 1300 may include output means, such as a monitor 1312 (e.g., a liquid crystal display (LCD), a plasma display, or cathode ray tube (CRT) monitor). The computer system 1300 may be connected to a network (e.g., a local area network (LAN), a wide area network (WAN) such as the Internet, or any other type of network) via a network interface connection (not shown). Many different types of computer systems exist, and the aforementioned input and output means may take other forms. Generally speaking, the computer system 1300 includes at least the minimal processing, input, and/or output means necessary to practice embodiments of the invention.

Software instructions in the form of computer readable program code to perform embodiments of the invention may be stored, in whole or in part, temporarily or permanently, on a computer readable medium such as a compact disc (CD), a diskette, a tape, physical memory, or any other computer readable storage medium. Specifically, the software instructions may correspond to computer readable program code that when executed by a processor(s), is configured to perform embodiments of the invention. In one or more embodiments of the invention, the computer readable medium is a non-transitory computer readable medium.

Further, one or more elements of the aforementioned computer system 1100 may be located at a remote location and connected to the other elements over a network. Further, embodiments of the invention may be implemented on a distributed system having a plurality of nodes, where each portion of the invention (e.g., baseband processing unit, converting circuit, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An antenna system, comprising:
   a plurality of antenna elements arranged in an array, each antenna element comprising:
      one or more first terminals that receive a vertically polarized wireless signal at a radio frequency,
      one or more second terminals that receive a horizontally polarized wireless signal at the radio frequency,
      a first phase shifter configured to shift a phase of the vertically polarized wireless signal received by the antenna element, and
      a second phase shifter configured to shift a phase of the horizontally polarized wireless signal received by the antenna element;
   a first signal combining circuit that combines the vertically polarized wireless signal received by the one or more first terminals of the plurality of antenna elements to obtain a combined vertically polarized signal;
   a second signal combining circuit that combines the horizontally polarized wireless signal received by the one or more second terminals of the plurality of antenna elements to obtain a combined horizontally polarized signal;
   a first frequency converting circuit that converts the combined vertically polarized signal to a baseband vertically polarized signal operating at a baseband frequency different from the radio frequency;
   a second frequency converting circuit that converts the combined horizontally polarized signal to a baseband horizontally polarized signal operating at the baseband frequency; and
   a baseband processing circuit that combines the baseband vertically polarized signal and the baseband horizontally polarized signal after applying a 90-degree phase shift to the baseband vertically polarized signal or the baseband horizontally polarized signal to obtain a left-hand circularly polarized (LHCP) signal or a right-hand circularly polarized (RHCP) signal.

2. The antenna system according to claim 1, each antenna element further comprising:
   a first complex gain circuit configured to apply a first complex gain to the vertically polarized wireless signal received by the antenna element; and
   a second complex gain circuit configured to apply a second complex gain to the horizontally polarized wireless signal received by the antenna element,
   wherein the first complex gain and the second complex gain are chosen for maximum ratio combining.

3. The antenna system according to claim 1, wherein the first phase shifter and the second phase shifter are 3-bit phase shifters.

4. The antenna system according to claim 1, wherein each antenna element in the antenna system is a patch antenna.

5. An antenna system, comprising:
a plurality of antenna elements arranged in an array, each antenna element comprising:
one or more first terminals that receive a vertically polarized wireless signal at a radio frequency, and
one or more second terminals that receive a horizontally polarized wireless signal at the radio frequency,
a first signal combining circuit that combines the vertically polarized wireless signal received by the one or more first terminals of the plurality of antenna elements to obtain a combined vertically polarized signal;
a second signal combining circuit that combines the horizontally polarized wireless signal received by the one or more second terminals of the plurality of antenna elements to obtain a combined horizontally polarized signal;
a first frequency converting circuit that converts the combined vertically polarized signal to a baseband vertically polarized signal operating at a baseband frequency different from the radio frequency;
a second frequency converting circuit that converts the combined horizontally polarized signal to a baseband horizontally polarized signal operating at the baseband frequency; and
a baseband processing circuit that combines the baseband vertically polarized signal and the baseband horizontally polarized signal after applying a 90-degree phase shift to the baseband vertically polarized signal or the baseband horizontally polarized signal to obtain a left-hand circularly polarized (LHCP) signal or a right-hand circularly polarized (RHCP) signal,
wherein the array of antenna elements is divided into a primary array and an auxiliary array;
wherein each antenna element in the primary array comprises one first terminal and one second terminal, and each antenna element in the auxiliary array comprises two first terminals and two second terminals; and
wherein the antenna elements in the auxiliary array are geometrically arranged in a non-uniform manner.

6. The antenna system according to claim 5, wherein the antenna elements in the auxiliary array are geometrically arranged to include a first ring with a first radius and a second ring with a second radius.

7. The antenna system according to claim 6,
wherein the geometric arrangement of the antenna elements in the auxiliary array is optimized to minimize a cost function based on parameters including the first radius, the second radius, positions of antenna elements on the first ring, and positions of antenna elements on the second ring, and
wherein the cost function represents an average angular distance between a detected incident beam and an actual incident beam.

8. The antenna system according to claim 5,
wherein all of the antenna elements in the primary array are configured to track a first object; and
wherein all of the antenna elements in the auxiliary array are configured to simultaneously track the first object and a second object.

9. The antenna system according to claim 8, wherein the antenna system is configured to detect an angle of incident wave from the second object by:
reading a complex signal received by each antenna element in the auxiliary array to form a first N-by-one vector, where N is the number of antenna elements in the auxiliary array;
multiplying, in an analog RF domain, the vector by an N-by-N Hadamard matrix to obtain a second N-by-one vector;
wherein when an element in the first N-by-one vector is multiplied by "+1" in the N-by-N Hadamard matrix, the corresponding complex signal undergoes a 0-degree phase shift, and
wherein when an element in the first N-by-one vector is multiplied by "−1" in the N-by-N Hadamard matrix, the corresponding complex signal undergoes a 180-degree phase shift;
comparing, by the processor, the second N-by-one vector with a lookup table stored in a memory, wherein the lookup table includes:
a plurality of angles at which the auxiliary array receives signals; and
pre-calculated N-by-one vectors of signals received by the auxiliary array and multiplied by the N-by-N Hadamard matrix;
choosing, by the processor and from the lookup table, a pre-calculated N-by-one vector that is closest to the second N-by-one vector; and
determining, by the processor, the angle of incident wave as the angle corresponding to the chosen pre-calculated N-by-one vector.

10. A method for receiving and processing wireless signals, the method comprising:
disposing a plurality of antenna elements in an array, each antenna element comprising:
one or more first terminals that receive a vertically polarized wireless signal at a radio frequency; and
one or more second terminals that receive horizontally a polarized wireless signal at the radio frequency;
applying a first phase shift to the vertically polarized wireless signal received by each antenna element;
applying a second phase shift to the horizontally polarized wireless signal received by each antenna element;
combining the vertically polarized wireless signal received by the one or more first terminals to obtain a combined vertically polarized signal;
combining the horizontally polarized wireless signal received by the one or more second terminals to obtain a combined horizontally polarized signal;
converting the combined vertically polarized signal to a baseband vertically polarized signal operating at a baseband frequency different from the radio frequency;
converting the combined horizontally polarized signal to a baseband horizontally polarized signal operating at the baseband frequency; and
combining the baseband vertically polarized signal and the baseband horizontally polarized signal after applying a 90-degree phase shift to the baseband vertically polarized signal or the baseband horizontally polarized signal to obtain a left-hand circularly polarized (LHCP) signal or a right-hand circularly polarized (RHCP) signal.

11. The method according to claim 10, further comprising:
applying a first complex gain to the vertically polarized wireless signal received by each antenna element; and
applying a second complex gain to the horizontally polarized wireless signal received by each antenna element,
wherein the first complex gain and the second complex gain are chosen for maximum ratio combining.

12. The method according to claim 10, wherein the first phase shift and the second phase shift are applied using 3-bit phase shifters.

13. The method according to claim 10, further comprising:
- dividing the array of antenna elements into a primary array and an auxiliary array,
- wherein each antenna element in the primary array comprises one first terminal and one second terminal, and each antenna element in the auxiliary array comprises two first terminals and two second terminals;
- wherein a number of antenna elements in the primary array is greater than a number of antenna elements in the auxiliary array; and
- wherein the antenna elements in the auxiliary array are geometrically arranged in a non-uniform manner.

14. The method according to claim 13, wherein the antenna elements in the auxiliary array are geometrically arranged to include a first ring with a first radius and a second ring with a second radius.

15. The method according to claim 13, further comprising:
- optimizing the geometric arrangement of the antenna elements in the auxiliary array to minimize a cost function based on parameters including the first radius, the second radius, positions of antenna elements on the first ring, and positions of antenna elements on the second ring,
- wherein the cost function represents an angular distance between a detected beam and an actual beam.

16. The method according to claim 13, further comprising:
- tracking a first object using all of the antenna elements in the primary array; and
- simultaneously tracking the first object and a second object using all of the antenna elements in the auxiliary array.

17. The method according to claim 13, further comprising detecting an angle of incident wave from the second object by:
- reading, by a processor, a complex signal received by each antenna element in the auxiliary array to form a first N-by-one vector, where N is the number of antenna elements in the auxiliary array;
- multiplying, by the processor, the vector by an N-by-N Hadamard matrix to obtain a second N-by-one vector;
- comparing, by the processor, the second N-by-one vector with a lookup table stored in a memory, wherein the lookup table includes:
    - a plurality of angles at which the auxiliary array receives signals; and
    - pre-calculated N-by-one vectors of signals received by the auxiliary array and multiplied by the N-by-N Hadamard matrix;
- choosing, by the processor and from the lookup table, a pre-calculated N-by-one vector that is closest to the second N-by-one vector; and
- determining, by the processor, the angle of incident wave as the angle corresponding to the chosen pre-calculated N-by-one vector,
- wherein when an element in the first n-by-one vector is multiplied by "+1" in the N-by-N Hadamard matrix, the corresponding complex signal undergoes a 0-degree phase shift; and
- wherein when an element in the first N-by-one vector is multiplied by "−1" in the N-by-N Hadamard matrix, the corresponding complex signal undergoes a 180-degree phase shift.

18. The method according to claim 13, wherein each antenna element is a patch antenna.

* * * * *